United States Patent
Takeda

(10) Patent No.: US 10,914,654 B2
(45) Date of Patent: Feb. 9, 2021

(54) OBSERVATION SYSTEM AND CONTROL METHOD FOR OBSERVATION SYSTEM

(71) Applicant: SEIKO EPSON CORPORATION, Tokyo (JP)

(72) Inventor: Kazuyoshi Takeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 369 days.

(21) Appl. No.: 15/470,037

(22) Filed: Mar. 27, 2017

(65) Prior Publication Data

US 2017/0284892 A1    Oct. 5, 2017

(30) Foreign Application Priority Data

Apr. 1, 2016    (JP) .................................. 2016-074028

(51) Int. Cl.
| | |
|---|---|
| *G01M 7/02* | (2006.01) |
| *G01M 5/00* | (2006.01) |
| *G01H 13/00* | (2006.01) |

(52) U.S. Cl.
CPC ............ *G01M 7/025* (2013.01); *G01H 13/00* (2013.01); *G01M 5/0008* (2013.01); *G01M 5/0041* (2013.01); *G01M 5/0066* (2013.01)

(58) Field of Classification Search
CPC .. G01M 7/025; G01M 5/0066; G01M 5/0041; G01M 5/0008; G01H 13/00
See application file for complete search history.

(56) References Cited

U.S. PATENT DOCUMENTS

| | | | | |
|---|---|---|---|---|
| 4,095,474 A | * | 6/1978 | Hancock ................ | G01H 13/00 73/579 |
| 4,775,118 A | * | 10/1988 | Daniels .................. | B64D 15/20 244/134 D |
| 5,206,806 A | * | 4/1993 | Gerardi .................. | B64D 15/16 244/134 F |
| 5,305,235 A | * | 4/1994 | Izui ........................ | G06F 11/22 702/185 |
| 6,286,370 B1 | * | 9/2001 | Sinha ...................... | G01N 5/02 73/579 |
| 2008/0061959 A1 | * | 3/2008 | Breed ..................... | B60C 11/24 340/539.1 |
| 2009/0066539 A1 | * | 3/2009 | Uemura ................. | G08G 1/052 340/905 |
| 2013/0327756 A1 | * | 12/2013 | Clemen, Jr. ........... | B64D 15/20 219/202 |

(Continued)

FOREIGN PATENT DOCUMENTS

| | | |
|---|---|---|
| JP | H07-084067 A | 3/1995 |
| JP | H09-113635 A | 5/1997 |

(Continued)

*Primary Examiner* — Daniel S Larkin
*Assistant Examiner* — Anthony W Megna Fuentes
(74) *Attorney, Agent, or Firm* — Oliff PLC

(57) ABSTRACT

An observation system includes an information acquiring section configured to acquire sensor information from a sensor section set in a structure and configured to detect vibration of the structure and a processing section configured to calculate information concerning a peak vibration frequency of the vibration on the basis of the sensor information and determine a surface state of the structure on the basis of the information concerning the peak vibration frequency.

15 Claims, 25 Drawing Sheets

(56) References Cited

U.S. PATENT DOCUMENTS

| | | | |
|---|---|---|---|
| 2014/0067284 A1* | 3/2014 | Breed | E05F 15/43 |
| | | | 702/34 |
| 2014/0160440 A1 | 6/2014 | Gyoten | |
| 2014/0166813 A1* | 6/2014 | Greene | B64D 15/20 |
| | | | 244/134 F |
| 2015/0177195 A1* | 6/2015 | Sasaki | G01N 29/12 |
| | | | 73/579 |

FOREIGN PATENT DOCUMENTS

| | | |
|---|---|---|
| JP | H09-318766 A | 12/1997 |
| JP | H10-239111 A | 9/1998 |
| JP | 2007-071551 A | 3/2007 |
| JP | 2014-074654 A | 4/2014 |
| JP | 2014-132258 A | 7/2014 |

* cited by examiner

OBSERVATION SYSTEM AND CONTROL METHOD FOR OBSERVATION SYSTEM

BACKGROUND

1. Technical Field

The present invention relates to an observation system, a control method for the observation system, and the like.

2. Related Art

There has been known a method of determining a surface state of a structure. For example, JP-A-9-318766 (Patent Literature 1) discloses a system that compares absorptions of infrared lights having two wavelengths to detect freezing of a road surface. JP-A-10-239111 (Patent Literature 2) discloses a method of detecting, from a resonance frequency change, adhesion of moisture to a sensor surface configured by a dielectric and combining the resonance frequency change with temperature information to detect freezing of a road surface.

Besides, there have been known various methods of detecting a frozen state and a snow-covered state of a structure surface. There have been also known, for example, a method of determining the frozen state and the snow-covered state from an image using a camera, a method of determining the frozen state and the snow-covered state using a laser.

In the method of Patent Literature 1, a detection target is limited to a portion on which infrared light is radiated in a road. In Patent Literature 2, it is determined whether moisture adheres to the dielectric. A portion where the dielectric is provided is a detection target. That is, in both of freezing detection systems, a sensing region is limited to a part of a road surface. A determination result sometimes does not appropriately reflect a state of the entire surface of a structure. A large number of measuring devices are necessary in order to expand the sensing region.

SUMMARY

An advantage of some aspects of the invention is to provide an observation system, a control method for the observation system, and the like for appropriately determining a surface state of a structure using information concerning a peak vibration frequency.

An aspect of the invention relates to an observation system including: an information acquiring section configured to acquire sensor information from a sensor section set in a structure and configured to detect vibration of the structure; and a processing section configured to calculate information concerning a peak vibration frequency of the vibration on the basis of the sensor information and determine a surface state of the structure on the basis of the information concerning the peak vibration frequency.

In the aspect of the invention, the surface state of the structure is determined on the basis of the information concerning the peak vibration frequency of the vibration of the structure. Since the peak vibration frequency is determined according to characteristics of the entire structure, which is a measurement target, by performing the determination using the information concerning the peak vibration frequency, it is possible to, for example, perform a state determination targeting a wide range of the structure surface.

In the aspect of the invention, the processing section may determine the surface state of the structure on the basis of change information of the peak vibration frequency.

With this configuration, it is possible to use the change information of the peak vibration frequency for the determination of the surface state.

In the aspect of the invention, the processing section may determine the surface state of the structure on the basis of a change width in a predetermined period of the peak vibration frequency.

With this configuration, it is possible to use the change width in the predetermined period of the peak vibration frequency for the determination of the surface state.

In the aspect of the invention, the processing section may determine that the surface state is a first surface state when the change width in the predetermined period is larger than a given threshold and determine that the surface state is a second surface state different from the first surface state when the change width in the predetermined period is equal to or smaller than the given threshold.

With this configuration, it is possible to determine the surface state according to comparison processing of the change width in the predetermined period of the peak vibration frequency and the given threshold.

In the aspect of the invention, the processing section may variably set the given threshold.

With this configuration, it is possible to flexibly set a threshold used for the determination of the surface state.

In the aspect of the invention, the first surface state may be at least one of a frozen state and a snow-covered state.

With this configuration, as the determination of the surface state of the structure, it is possible to determine whether the surface state is at least one of the frozen state and the snow-covered state.

In the aspect of the invention, the information acquiring section may acquire ambient temperature information of the structure, and the processing section may determine the surface state of the structure on the basis of the ambient temperature information and the information concerning the peak vibration frequency.

With this configuration, it is possible to determine the surface state on the basis of the ambient temperature information and the peak vibration frequency.

In the aspect of the invention, the observation system may further include: the sensor section; a power supplying section including a battery; and a charging section configured to perform charging of the battery with natural energy, and the processing section may perform monitoring processing of a state of the structure on the basis of the sensor information acquired from the sensor section.

With this configuration, it is possible to use, for the determination of the surface state, a state monitoring system for monitoring the surface state of the structure using the natural energy.

In the aspect of the invention, the structure may be a bridge, and the processing section may perform monitoring processing of traffic volume information of the bridge on the basis of the sensor information acquired from the sensor section.

With this configuration, it is possible to use, for the determination of the surface state, a monitoring system for monitoring the traffic volume information of the bridge.

In the aspect of the invention, the sensor section may be set, in abridge girder connected to a first bridge pier and a second bridge pier of the bridge, in a center portion between the first bridge pier and the second bridge pier.

With this configuration, it is easy to detect the vibration. It is possible to highly accurately determine the surface state.

In the aspect of the invention, the observation system may further include a notifying section configured to perform notification processing of the surface state of the structure.

With this configuration, it is possible to perform notification of the determined surface state.

In the aspect of the invention, the information acquiring section may acquire weather information, and the processing section may determine on the basis of the weather information whether the determination of the surface state of the structure is performed.

With this configuration, it is possible to use the weather information for the determination concerning whether the determination of the surface state is performed.

Another aspect of the invention relates to a control method for an observation system including: acquiring sensor information from a sensor section set in a structure and configured to detect vibration of the structure; calculating information concerning a peak vibration frequency of the vibration on the basis of the sensor information; and determining a surface state of the structure on the basis of the calculated information concerning the peak vibration frequency.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment is explained below. Note that the embodiment explained below does not unduly limit the contents of the invention described in the appended claims. Not all of components explained in the embodiment are always essential constituent elements of the invention.

1. Method in this Embodiment

First, a method in this embodiment is explained. There have been known various methods of determining a surface state of a structure, specifically, a frozen state and a snow-covered state. When a road or a bridge is the structure, if the frozen state and the snow-covered state can be detected, it is possible to notify dangers such as a slip to a driver of a vehicle traveling on the road.

However, in the methods in the past disclosed in Patent Literature 1 and Patent Literature 2, a sensing target is limited to a part of a structure surface. Therefore, in the methods in the past, even when only the part is frozen, a determination result indicating the frozen state is acquired. If the request for slip suppression of the vehicle is taken into account, what should be detected is a surface state of the entire structure indicating whether a wide range of the structure surface is frozen. That is, in the methods in the past, it is likely that deviation occurs between the acquired determination result of the surface state and the surface state of the entire structure that should originally be acquired. If it is attempted to suppress such deviation, it is necessary to increase the numbers of sensors and detection devices provided in the structure. Time and cost required for setting and maintenance management cause a problem.

Figure 1:
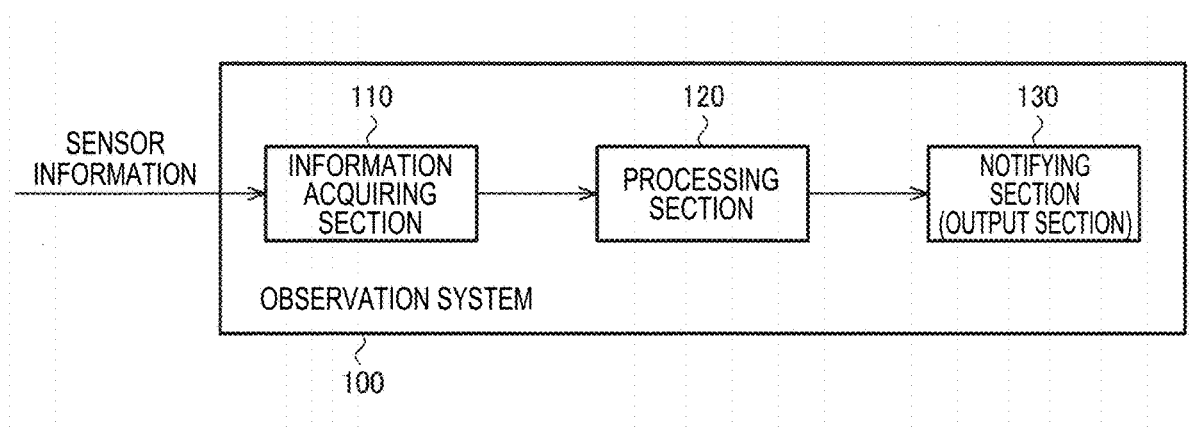
FIG. 1 is a configuration example of an observation system.

Therefore, the applicant proposes a method of more accurately realizing, with a small number of sensors, surface state determination of a wide range of a structure, in a narrow sense, a method of realizing, with one sensor, surface state determination of the entire structure. An observation system 100 according to this embodiment includes, as shown in FIG. 1, an information acquiring section 110 configured to acquire sensor information from a sensor section 140 set in the structure and configured to detect vibration of the structure and a processing section 120 configured to calculate information concerning a peak vibration frequency of vibration on the basis of the sensor information and determine a surface state of the structure on the basis of the information concerning the peak vibration frequency.

Vibration characteristics of a structure are determined by the size, the weight, the shape, the material, and the like of the structure. That is, when a frequency having high intensity (energy) compared with the other frequencies among vibration frequencies of the structure is set as a peak vibration frequency, the peak vibration frequency is information representing characteristics of the entire structure. Details of a method of calculating the peak vibration frequency are explained below. For example, frequency conversion processing only has to be performed on a temporal change waveform of vibration intensity (an acceleration signal) to set a frequency having a maximum value of the intensity as the peak vibration frequency.

The peak vibration frequency is considered to correspond to a resonance state of one vibration mode or any one of a plurality of vibration modes of a three-dimensional structure. When a structure has a plurality of vibration modes and a plurality of vibration frequencies are detected as the peak vibration frequency according to the plurality of vibration modes, "the information concerning the peak vibration frequency" may be anyone vibration frequency (e.g., a maximum vibration frequency explained below) among the plurality of vibration frequencies or may be two or more vibration frequencies among the plurality of vibration frequencies. Note that, when vibration of a bridge girder of abridge is measured, it is conceivable that a change in a fixed condition (a boundary condition of vibration) occurs because of freezing of the bridge girder and a resonance condition changes or is divided into a plurality of modes. In general, a natural vibration frequency of an object tends to be smaller as the object is larger or heavier. Therefore, it is inferred that the peak vibration frequency in this embodiment indicates the same tendency.

In the method in this embodiment, the surface state of the structure is determined on the basis of the peak vibration frequency. Therefore, a determination result represents a surface state of the entire structure unlike the method in the past. As a result, it is possible to determine a surface state of the entire structure with a small number of sensors (in a narrow sense, one sensor).

Note that, in Patent Literature 2, a change in a natural frequency (a resonance frequency) of a resonator is only detected. The method disclosed in Patent Literature 2 is not a method of using the peak vibration frequency of the vibration of the structure, which is a target of the surface state determination. Patent Literature 2 does not mention that, in the method in the past, it is possible to determine the surface state from the information concerning the peak vibration frequency of the structure.

In the following explanation, first, configuration examples of the observation system 100 according to this embodiment and a system including the observation system 100 are explained. Thereafter, it is explained based on measured data that it is possible to determine a surface state using a peak vibration frequency. Lastly, several modifications are explained.

2. System Configuration Example

A configuration example of the observation system 100 according to this embodiment is as shown in FIG. 1. The observation system 100 includes the information acquiring section 110, the processing section 120, and a notifying section (an output section) 130 configured to perform notification processing of the surface state of the structure. However, the observation system 100 is not limited to the configuration shown in FIG. 1. Various modified implementations for, for example, omitting a part of the components and adding other components are possible. When the observation system 100 is realized by a sensor terminal device 200 explained below with reference to FIGS. 2 and 3, the observation system 100 may include the sensor section 140.

The information acquiring section 110 acquires sensor information from the sensor section 140. When the observation system 100 includes the sensor section 140, the information acquiring section 110 may be realized as an interface for sensor information acquisition such as an A/D converter that performs A/D conversion of an analog signal received from the sensor section 140 or an amplifier that performs amplification processing of the analog signal. Alternatively, when the sensor information is acquired in an external apparatus, the information acquiring section 110 is realized as a reception processing section that performs reception of information from the external apparatus.

The processing section 120 performs various kinds of processing on the basis of the sensor information acquired by the information acquiring section 110. The function of the processing section 120 can be realized by hardware such as various processors (a CPU, etc.) and an ASIC (Application Specific Integrated Circuit; a gate array, etc.), a computer program, and the like. Specifically, the processing section 120 performs processing for calculating the peak vibration frequency of the structure on the basis of the sensor information and processing for determining a surface state on the basis of the calculated peak vibration frequency.

The notifying section 130 performs processing for notifying a user of a determination result of the surface state in the processing section 120. The notifying section 130 may be a display section and may display a determination result. Alternatively, the notifying section 130 may be a vibrating section or a light source section and may perform notification with vibration or light emission. Alternatively, the notifying section 130 may be a communication section (a transmission processing section) and may perform transmission of notification information for performing notification processing in other apparatuses.

Figure 2:
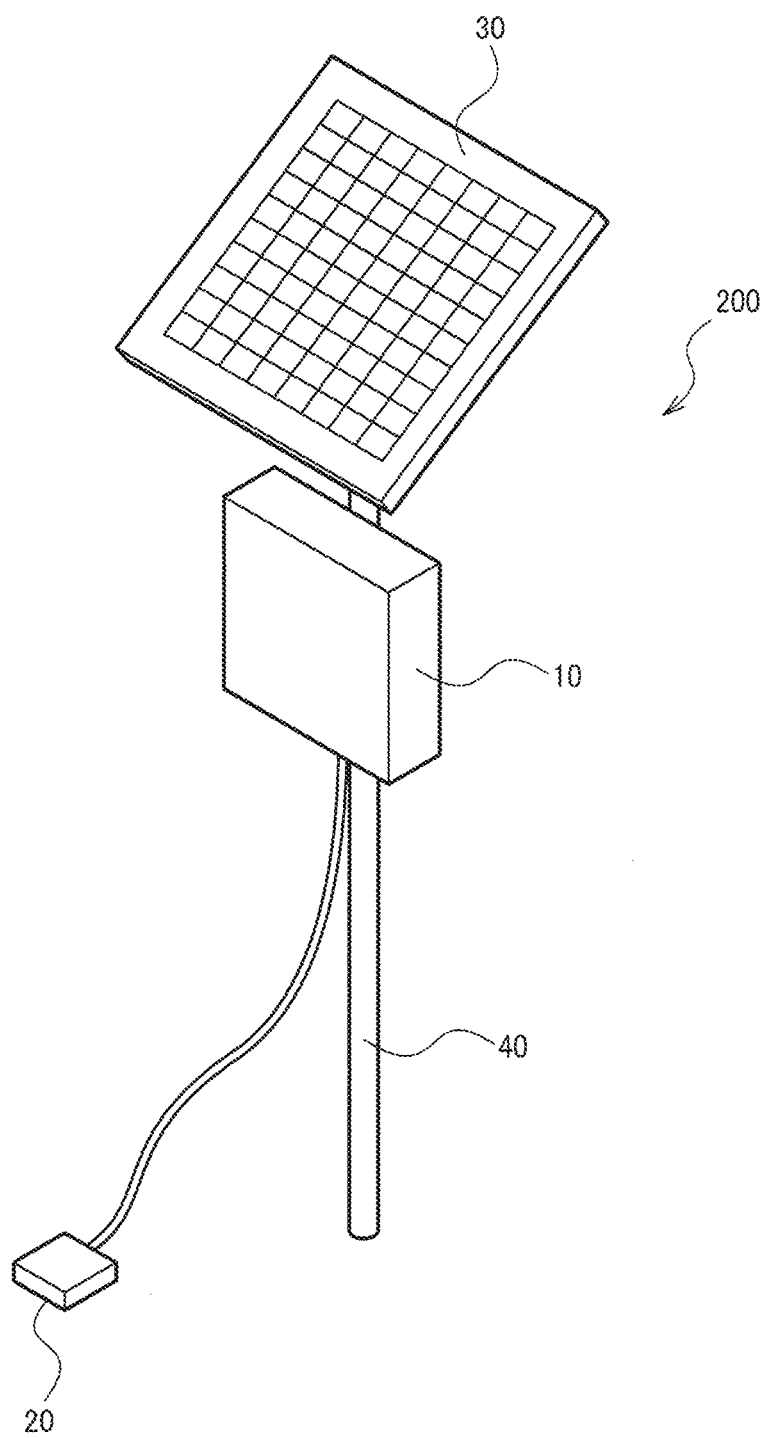
FIG. 2 is an exterior example of a sensor terminal device.

FIG. 2 is an example of an exterior view of the sensor terminal device 200 used in a system including the observation system 100 according to this embodiment. The sensor terminal apparatus 200 includes a housing 10, a sensor housing 20, a solar panel 30, and a column 40. However, the sensor terminal device 200 is not limited to the configuration shown in FIG. 2. Various modified implementations for, for example, omitting a part of the components and adding other components are possible.

The housing 10 is a housing configured to house a substrate on which the processing section 120 is provided. The sensor housing 20 is a housing connected to the housing 10 by a cable and configured to house various sensors included in the sensor section 140.

In this embodiment, the sensor section 140 includes at least a vibration sensor in order to detect a peak vibration frequency of vibration of the structure. The vibration sensor is a sensor that detects the vibration of the structure. The vibration sensor can be realized by, for example, an acceleration sensor. Since the vibration appears as a change in acceleration, vibration intensity is detected from the magnitude of acceleration. A vibration frequency is detected from a frequency characteristic of the acceleration (e.g., a result of FFT (Fast Fourier Transform)). A specific method of calculating the peak vibration frequency is explained below. The vibration sensor detects vibration of the structure at the time when some force is applied to the structure, for example, vibration at the time when a vehicle passes the structure, which is a road or a bridge.

However, the sensor section 140 may include other sensors. The sensor section 140 may include, for example, an inclination sensor that detects inclination of the structure, a water level sensor that detects a water level, and an image pickup sensor that picks up an image of the structure and outputs a picked-up image. Therefore, although one sensor housing 20 is provided in the example shown in FIG. 2, a plurality of housing sensors 20 may be provided. For example, the vibration sensor and the inclination sensor are provided on the surface of the structure, the water level sensor is provided in a position where at least a part of the water level sensor is immersed in measurement target liquid, and the image pickup sensor is provided in a position and at an angle for enabling the image pickup sensor to pickup an image of a desired region of the structure. That is, since a desired setting position is different according to a type of a sensor, various modified implementations are possible concerning the number, the shape, the setting position, and the setting method of the sensor housing 20. Alternatively, a part of the sensors may be housed in the housing 10.

The solar panel 30 is a panel that generates electric power on the basis of the irradiation of the sunlight. The solar panel 30 is configured by an array of a plurality of solar battery elements (cells). This is because, in a system that performs surface state determination of a structure (in a broad sense, state detection of the structure), it is desirable to use an independent device. In the independent device, for example, work for setting cables for power supply and information communication is unnecessary and it is unnecessary to take into account abnormality of the cables. In a situation in which abnormality occurs in the structure, it is likely that abnormality such as disconnection also occurs in the cables. It is likely that electric power is not supplied in a situation in which measurement is necessary or measured information cannot be output to the outside. However, in the independent device, such likelihood does not have to be taken into account.

When the cable for power supply is not provided, a battery needs to be incorporated in a device for measurement. When a battery that needs to be replaced or charged by the user is used as the battery, a maintenance burden on the user undesirably increases. Therefore, it is desirable to use a device that does not require the power supply by the cable and the charging by the user. Use of natural energy is conceivable. In the state detection of the structure, abnormality of the structure, occurrence time of which is unknown, has to be detected. Therefore, constant monitoring is important. From that viewpoint, an advantage of using charging by the natural energy is significant.

The column 40 is a member for fixing the housing 10 and the solar panel 30 to desired positions. The housing 10 and the solar panel 30 are fixed to the column 40. The column 40 maintains a stable posture with respect to the structure to set the housing 10 and the solar panel 30 in desired positions and postures. Note that, since the solar panel 30 needs to receive the irradiation of the sunlight, the solar panel 30 is desirably provided in a position exposed to the sunlight. In some case, the posture of the solar panel 30 may be changed according to an irradiation state of the sunlight.

Figure 3:
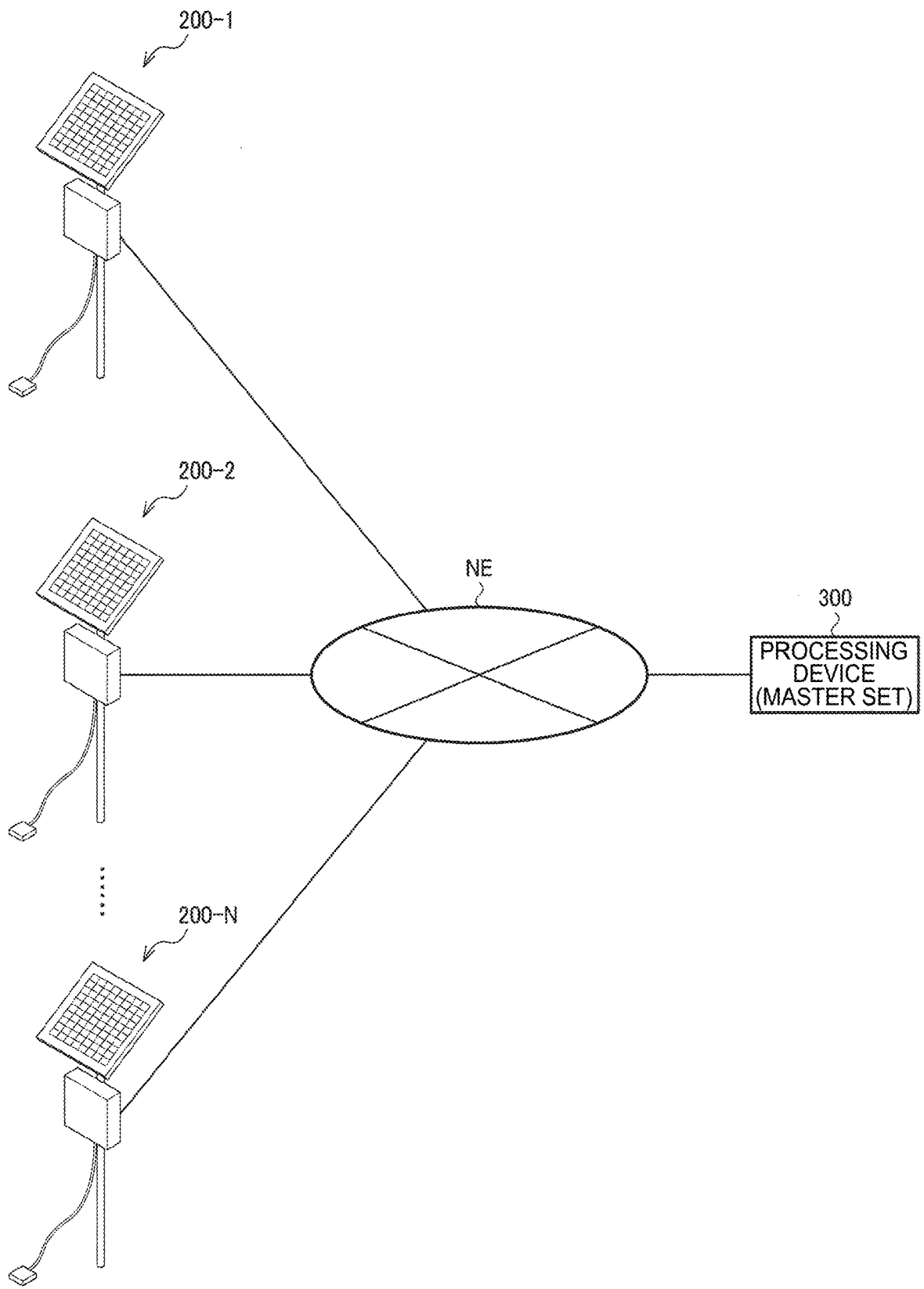
FIG. 3 is a configuration example of a system including an observation system.

FIG. 3 is a configuration example of the system including the observation system 100 in this embodiment. The observation system 100 according to this embodiment may be realized as the sensor terminal device 200 alone but may be used together with another processing device 300 (a master set). A plurality of sensor terminal devices 200 may be connected to the master set.

In the example shown in FIG. 3, first to N-th sensor terminal devices 200-1 to 200-N are connected to the processing device 300 via a network NE. As the network NE, various networks such as a WAN (Wide Area Network), a LAN (Local Area Network), and a short range wireless communication can be used. The respective first to N-th sensor terminal devices 200-1 to 200-N have the configuration shown in FIG. 2, perform sensing by a sensor (the sensor section 140) included in the sensor housing 20, and acquires sensor information.

In the example shown in FIG. 3, the observation system 100 according to this embodiment may be realized by the sensor terminal device 200 or may be realized by the processing device 300.

When the observation system 100 is realized by the sensor terminal device 200, the information acquiring section 110 of the observation system 100 acquires sensor information from the sensor section 140 (the sensor provided in the sensor housing 20) included in the observation system 100. The processing section 120 is mounted on a substrate included in the housing 10. The processing section 120 executes determination processing of the surface state of the structure on the basis of the sensor information. The notifying section 130 is realized by, for example, a communication section (a transmission processing section) and performs processing for transmitting a determination result of the surface state to the processing device 300. When the sensor terminal device 200 includes a display section or a light emitting section viewable from a driver of a vehicle that passes the structure (a road or a bridge) or a speaker capable of executing notification to the driver with sufficient volume, the notifying section 130 is not prevented from being realized by the display section, the light emitting section, the speaker, or the like.

Alternatively, the observation system 100 may be realized by a part of the sensor terminal device 200 shown in FIG. 2. For example, the observation system 100 in this embodiment may be realized by a unit (in a narrow sense, a unit housed in the housing 10) including an interface for acquiring sensor information and a processor.

When the observation system 100 is realized by the processing device 300, the information acquiring section 110 of the observation system 100 is realized as a communication section (a reception processing section) that acquires, via the network NE, sensor information from the sensor section 140 (the sensor provided in the sensor housing 20) included in the sensor terminal device 200. The processing section 120 is realized by a processor included in the processing device 300. The notifying section 130 is realized by an interface for notification included in the processing device 300. For example, as in the example explained above, the notifying section 130 can be realized by a display section, a light emitting section, a speaker, or the like. The processing device 300 is not limited to a processing device provided in a position close in distance to the structure in which the sensor terminal device 200 is provided. Therefore, as notification in this case, notification to an administrator or the like of the structure rather than the user who actually passes the structure is assumed. However, the notification in the notifying section 130 is not limited to the notification performed in the processing device 300 and includes transmission processing of information for notification to other apparatuses. The determination result of the surface state may be transmitted to the sensor terminal device 200. The sensor terminal device 200 may perform the notification processing. Alternatively, the processing device 300 may be realized as a server system that performs a road state notification service targeting the driver of the vehicle. The notifying section 130 in that case may perform transmission processing of information to a terminal (a PC, a smartphone, etc.) of a service user.

Alternatively, the processing according to this embodiment may be executed by distributed processing. In that case, the observation system 100 according to this embodiment may be realized by both of the sensor terminal device 200 and the processing device 300.

Sensor terminal devices of the first to N-th sensor terminal devices 200-1 to 200-N are respectively disposed in, for example, different structures. In FIG. 3, all of the sensor terminal devices 200 have the same structure. However, the shapes, the numbers of included sensors, and types of the sensor terminal devices 200 may be changed according to setting places.

When the observation system 100 is realized by the sensor terminal device 200, as explained above with reference to FIG. 2, the observation system 100 may include the sensor section 140, the power supply section including the battery, and the charging device that performs charging of the battery with the natural energy. Although not shown in FIG. 2, the power supply section (the battery) is housed in, for example, the housing 10. The charging section can be realized by, for example, the solar panel 30 shown in FIG. 2 and various circuits that supply electric power received from the solar panel 30 to the battery.

In this way, it is possible to realize the observation system 100 that can operate independently. When the independent observation system 100 is realized, it is unnecessary to limit an observation target to the surface state of the structure. A state of the structure may be extensively monitored. For example, the processing section 120 may perform monitoring processing of the state of the structure on the basis of sensor information received from the sensor section 140.

For example, the structure may be a bridge. The processing section 120 may perform monitoring processing of traffic volume information of the bridge on the basis of the sensor information received from the sensor section 140.

In the bridge, vibration occurs when a vehicle passes the bridge. Therefore, it is possible to estimate presence or absence of the passage of the vehicle and the weight of the passed vehicle by detecting the vibration. That is, in this embodiment, the surface state is determined by calculating the information concerning the peak vibration frequency from the sensor information representing the vibration. However, it is also possible to detect the traffic volume information of the bridge from the sensor information representing the vibration. That is, the observation system 100 (the sensor terminal device 200) having the same configuration can be used for detection of two kinds of information, that is, the surface state and the traffic volume information.

Alternatively, the processing section 120 may perform detection of an abnormal state of the structure as the monitoring processing of the state of the structure. The abnormal state represents a state different from a normal state (a state in which the structure can be safely used) and represents a state in which disasters such as collapse and cave-in are likely to occur. In this case, the processing section 120 determines on the basis of the sensor information received from the vibration sensor whether the state of the structure is the abnormal state. For example, when vibration characteristics (vibration intensity and a vibration frequency) not observed at normal time are observed, the processing section 120 determines that the state of the structure is the abnormal state.

When the sensor section 140 includes sensors other than the vibration sensor, the processing section 120 may perform the monitoring processing of the state of the structure using the sensors. For example, when the sensor section 140 includes an inclination sensor, the processing section 120 determines that the state of the structure is the abnormal state when the structure has an inclination angle greatly different from an inclination angle at the normal time or when it is predicted that the inclination angle of the structure is an inclination angle greatly different from the inclination angle at the normal time. Besides, methods of determining the abnormal state from a water level sensor and an image pickup sensor are known. The processing section 120 in this embodiment may perform the monitoring processing of the state of the structure according to the methods. In any case, the observation system 100 in this embodiment can be realized by diverting a system that performs monitoring processing of a state not limited to the surface state of the structure.

Figure 4:
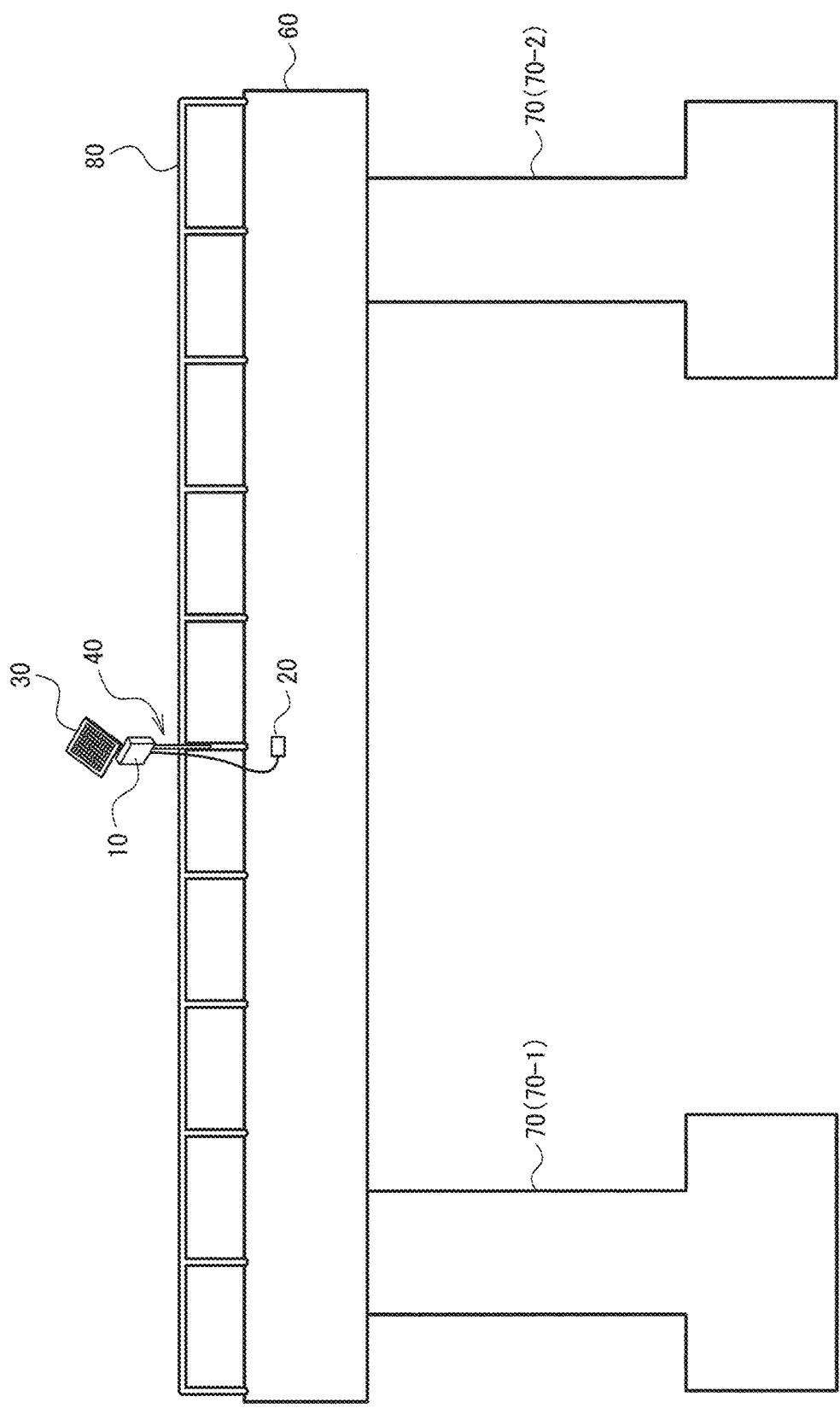
FIG. 4 is a setting example of the sensor terminal device in a bridge.

FIG. 4 is a diagram for explaining a setting example of the observation system 100 (the sensor terminal device 200) at the time when the structure is a bridge. FIG. 4 is a diagram of the bridge observed from the horizontal direction. As shown in FIG. 4, the bridge includes a bridge girder 60 and bridge piers 70. In FIG. 4, an example is shown in which the bridge includes a first bridge pier 70-1 and a second bridge pier 70-2 as the bridge piers 70.

In this case, the sensor section 140 is desirably set in the center portion between the first bridge pier 70-1 and the second bridge pier 70-2 in the bridge girder 60 connected to the first bridge pier 70-1 and the second bridge pier 70-2 of the bridge. Note that the center portion represents a position near the center between the first bridge pier 70-1 and the second bridge pier 70-2 in the longitudinal direction of the bridge girder 60. The bridge is connected to the ground (or a river bottom or a sea bottom), which is a stable structure, in bridge pier portions of the plurality of bridge piers 70. That is, when force that causes vibration is applied to the bridge, the magnitude (the amplitude) of the vibration is small in the bridge pier portions and is large in portions away from the bridge piers. In view of the fact that more accurate processing more robust against noise can be performed as the amplitude is larger, the sensor section 140 may be provided in a position where the vibration is the largest, that is, the center between the first bridge pier 70-1 and the second bridge pier 70-2 or the position near the center. For example, when an axis in a direction along the longitudinal direction of the bridge girder is set and a coordinate of the first bridge pier 70-1 in the axis is represented as x1 and a coordinate of the second bridge pier 70-2 is represented as x2, the sensor section 140 is provided in a position where $(x1+x2)/2 \pm \alpha$ ($\alpha$ is a given constant).

In the example shown in FIG. 4, the sensor housing 20 including the sensor section 140 is set in a position in the center between the first bridge pier 70-1 and the second bridge pier 70-2 on the side surface of the bridge girder 60. In the example shown in FIG. 4, the bridge includes a balustrade 80. The column 40 of the sensor terminal device 200 is fixed to a part of the balustrade 80. Consequently, it is possible to fix the housing 10 and the solar panel 30 in an appropriate positional relation with the sensor housing 20.

However, a method of fixing the sensor terminal device 200 to the structure (the bridge) is not limited to the example shown in FIG. 4.

The observation system 100 in this embodiment includes a memory configured to store information (e.g., computer programs and various data) and a processor configured to operate on the basis of the information stored in the memory. The processor performs processing for acquiring sensor information from the sensor section 140 set in the structure and configured to detect vibration of the structure and processing for calculating information concerning a peak vibration frequency of the vibration on the basis of the sensor information and determining the surface state of the structure on the basis of the information concerning the peak vibration frequency.

The processor may be realized by, for example, hardware in which functions of sections are separate or may be realized by hardware in which functions of sections are integral. The processor may be, for example, a CPU (Central Processing Unit). However, the processor is not limited to the CPU. Various processors such as a GPU (Graphics Processing Unit) and a DSP (Digital Signal Processor) can be used. The processor may be a hardware circuit realized by an ASIC (Application Specific Integrated Circuit). The memory may be a semiconductor memory such as an SRAM or a DRAM, may be a register, may be a magnetic storage device such as a hard disk device, or may be an optical storage device such as an optical disk device. For example, the memory has stored therein a computer-readable command. The command is executed by the processor, whereby the functions of the sections of the observation system 100 are realized. The command may be a command of a command set configuring a computer program or may be a command for instructing the hardware circuit of the processor to operate.

An operation in this embodiment is realized, for example, as explained below. The processor acquires sensor information from the sensor section 140 and stores the acquired sensor information in the memory. The processor reads out the sensor information from the memory, calculates a peak vibration frequency on the basis of the sensor information, and stores the calculated peak vibration frequency in the memory. Further, the processor reads out the peak vibration frequency from the memory and determines the surface state of the structure on the basis of the peak vibration frequency. As an example, the processor only has to calculate a change width in a predetermined period of the peak vibration frequency, read out a given threshold from the memory, and perform magnitude determination of the change width and the given threshold to determine the surface state.

The sections of the observation system 100 in this embodiment are realized as modules of a computer program running on the processor. For example, the information acquiring section 110 is realized as an information acquiring module configured to acquire sensor information from the sensor section 140 set in the structure and configured to detect vibration of the structure. The processing section 120 is realized as a processing module configured to calculate information concerning a peak vibration frequency of the vibration on the basis of the sensor information and determine the surface state of the structure on the basis of the information concerning the peak vibration frequency.

3. Surface State Determination 3-1. Calculation of a Peak Vibration Frequency

Figure 5:
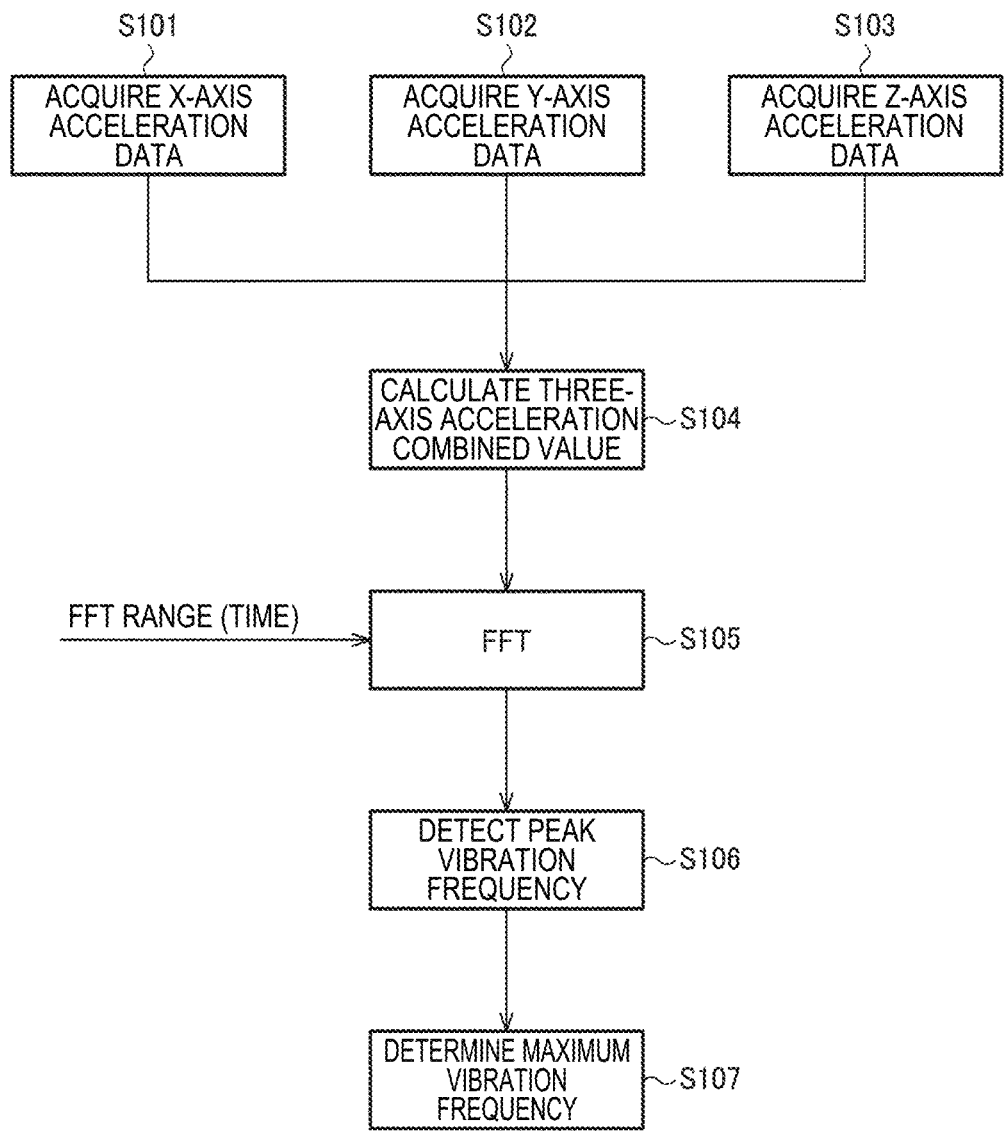
FIG. 5 is a flowchart for explaining arithmetic processing of a peak vibration frequency (a maximum vibration frequency).

FIG. 5 is a flowchart for explaining processing for calculating a peak vibration frequency (a maximum vibration frequency) of the structure on the basis of sensor information of a vibration sensor. The vibration sensor in this embodiment can be realized by an acceleration sensor. A flow of processing is explained assuming that the vibration sensor is a three-axis acceleration sensor.

When the processing is started, first, the processing section 120 acquires acceleration data of an X axis, a Y axis, and a Z axis of the three-axis acceleration sensor (steps S101 to S103). The processing section 120 calculates a combined value of accelerations on the basis of the acquired acceleration data of the axes (step S104). Note that, as combination of three-axis accelerations, various methods can be used. For example, a square sum of the acceleration data of the axes or a square root of the square sum only has to be calculated. When acceleration data of one axis among the three axes is dominant and can represent the acceleration in a three dimension (the three axes), the one axis may be selected to substitute the acceleration data for a three-axis acceleration combined value and perform processing explained below.

The processing section 120 performs FFT (Fast Fourier Transform) on the three-axis acceleration combined value (step S105). A range of the three-axis acceleration combined value serving as a target of the FFT is input as FFT range information. In this embodiment, the FFT is performed once targeting, for example, a three-axis acceleration combined value for one hour. In the following explanation, it is assumed that a processing result of the FFT (and a peak vibration frequency and a maximum vibration frequency acquired in steps S106 and S107 explained below) is acquired at a frequency of once in one hour. However, various modified implementations are possible concerning this point.

Intensities at frequencies are calculated by the FFT in step S105. A frequency to be a peak vibration frequency has high intensity compared with the other frequencies. Therefore, the processing section 120 performs peak detection from a result of the FFT to detect a frequency (a peak) having maximum intensity as a peak vibration frequency (step S106).

Ideally, the peak detected from the result of the FFT is one peak corresponding to a natural vibration frequency of the structure. However, in a research by the applicant, it has been found that a plurality of peaks are sometimes detected from the result of the FFT. As explained above, this is assumed to be because the structure has a plurality of vibration modes or a vibration mode is divided into a plurality of vibration modes because of a factor such as freezing. In this case, if the peak vibration frequency having maximum intensity is simply used for the processing, discontinuity occurs in values.

Figure 6:
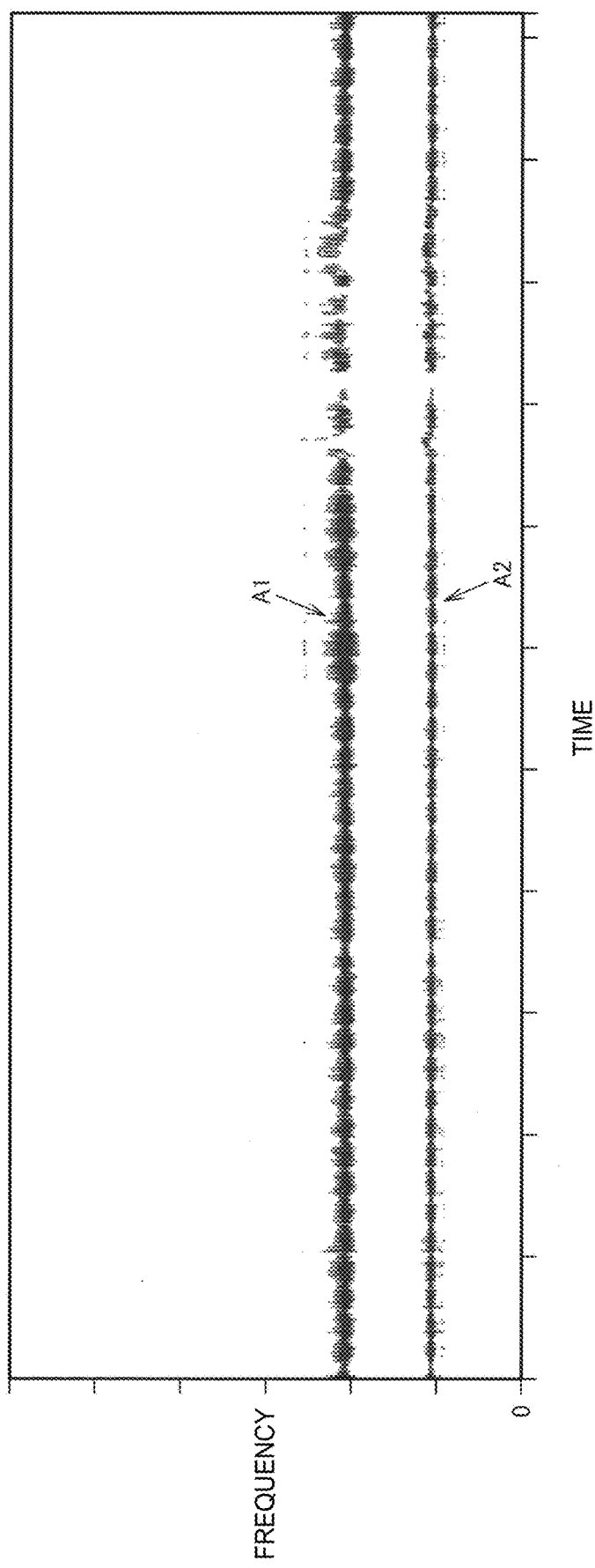
FIG. 6 is an example in which a plurality of peak vibration frequencies are detected.

FIG. 6 is a diagram representing a time-series change for one year of a peak vibration frequency calculated from an FFT result acquired once in one hour. One scale of the horizontal axis of FIG. 6 corresponds to thirty days. As it is seen from FIG. 6, two peak vibration frequencies are respectively detected at timings. The peak vibration frequencies can be classified into a first peak group (A1) and a second peak group (A2). When a peak vibration frequency having maximum intensity is simply adopted, timing when a peak included in A1 is adopted and timing when a peak included in A2 is adopted occur. As a result, values of the peak vibration frequencies do not have continuity.

Therefore, in this embodiment, the processing section 120 performs processing for determining, on the basis of the detection result of the peak vibration frequency at step S106, a peak vibration frequency (a maximum vibration frequency) used for the processing. As an example, the processing section 120 classifies peak vibration frequencies into peak groups on the basis of an FFT analysis result in a rather long period (e.g., one year) as shown in FIG. 6. The processing section 120 only has to perform the classification taking into account, for example, continuity of values. The processing section 120 sets any one peak group (e.g., the first peak group A1) as a peak group representing a peak vibration frequency (a maximum vibration frequency) used for the processing. Consequently, calculated values of peak vibration frequencies are stabilized. Therefore, it is possible to perform highly accurate processing.

3.2 Surface State Determination Based on the Peak Vibration Frequency

A method of determining a surface state from the information concerning the peak vibration frequency calculated by the processing explained above is explained. All of FIGS. 7 to 16 referred to below are data measured targeting one bridge or a peripheral environment of the bridge.

Figure 7:
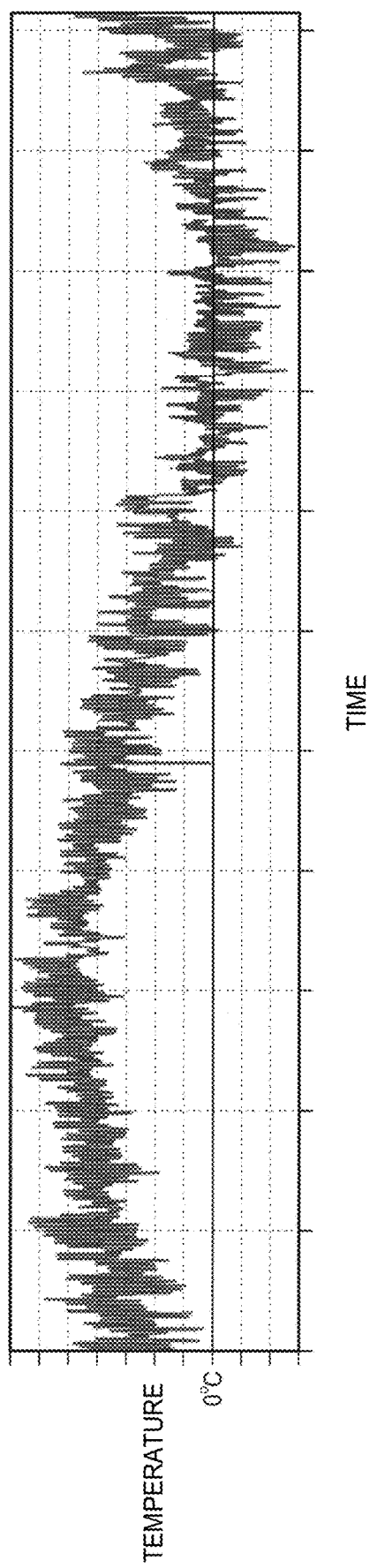
FIG. 7 is a temporal change example of ambient temperature information (temperature) of a given bridge.
Figure 8:
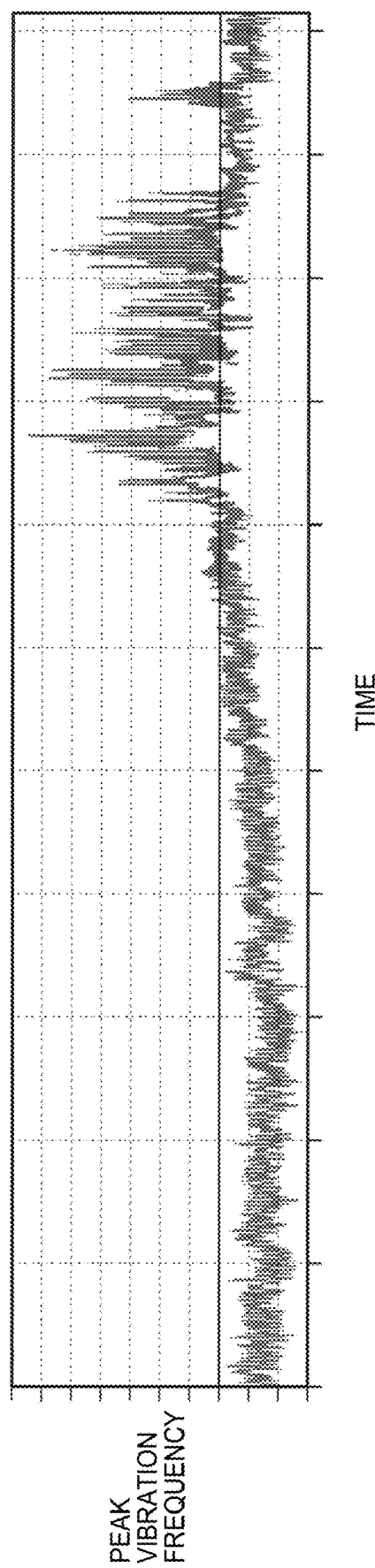
FIG. 8 is a temporal change example of a peak vibration frequency of the given bridge.

FIG. 7 is a diagram representing a time-series change in temperature. FIG. 8 is a diagram representing a time-series change in a peak vibration frequency. Both of FIGS. 7 and 8 show data for approximately one year. As the temperature and the peak vibration frequency, a plurality of data (e.g., one data in one hour) are acquired in one day. Therefore, FIGS. 7 and 8 are diagrams representing both of changes (fluctuations) in one day and changes due to seasons of the temperature and the peak vibration frequency. One scale of the horizontal axes of FIGS. 7 and 8 corresponds to thirty days as in FIG. 6. Note that information concerning the temperature shown in FIG. 7 may be acquired by a weather sensor included in the sensor terminal device 200 or may be acquired from a network such as the Internet.

As it is seen from FIG. 8, a degree of change in the peak vibration frequency increases from the beginning of December to the middle of February and around the middle of March. As it is seen from comparison with FIG. 7, this period substantially coincides with a period when the temperature drops below zero. In the period when the temperature drops below zero, it is assumed that a road surface is frozen (a frozen state) and fallen snow remains without melting (a snow-covered state). That is, it is predicted from FIGS. 7 and 8 that there is a correlation between the degree of change in the peak vibration frequency and the surface state of the structure.

Figure 9:
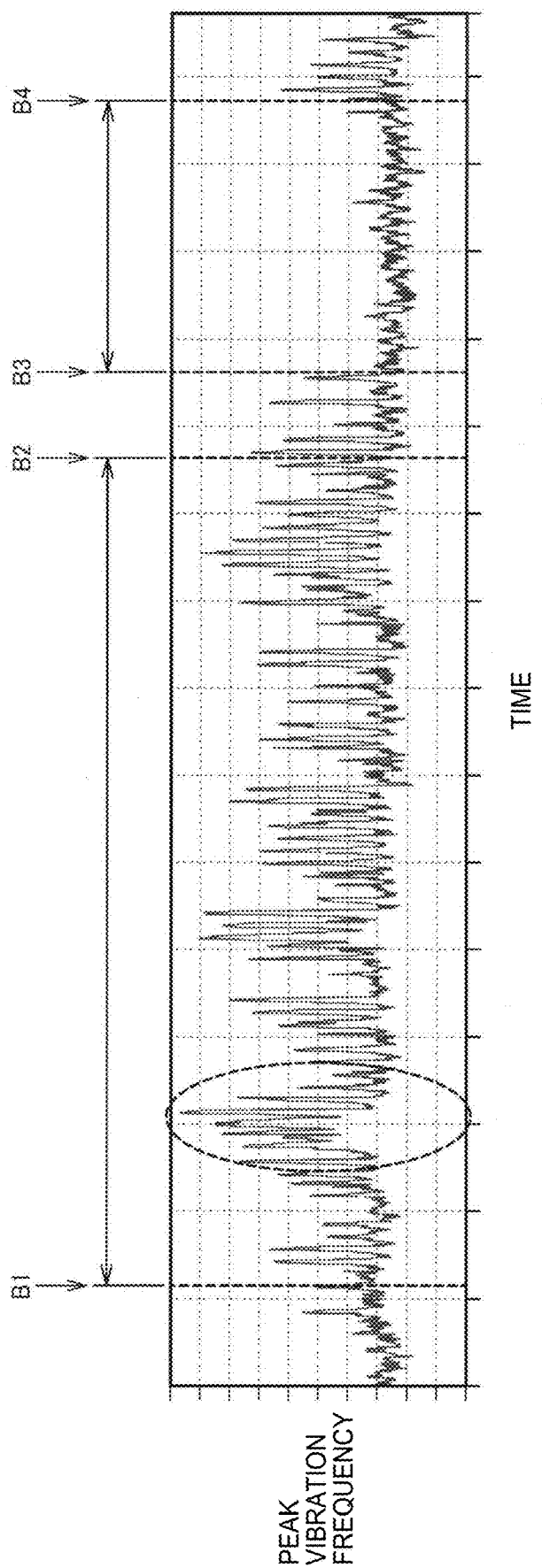
FIG. 9 is a detailed temporal change example of the peak vibration frequency of the given bridge.
Figure 10:
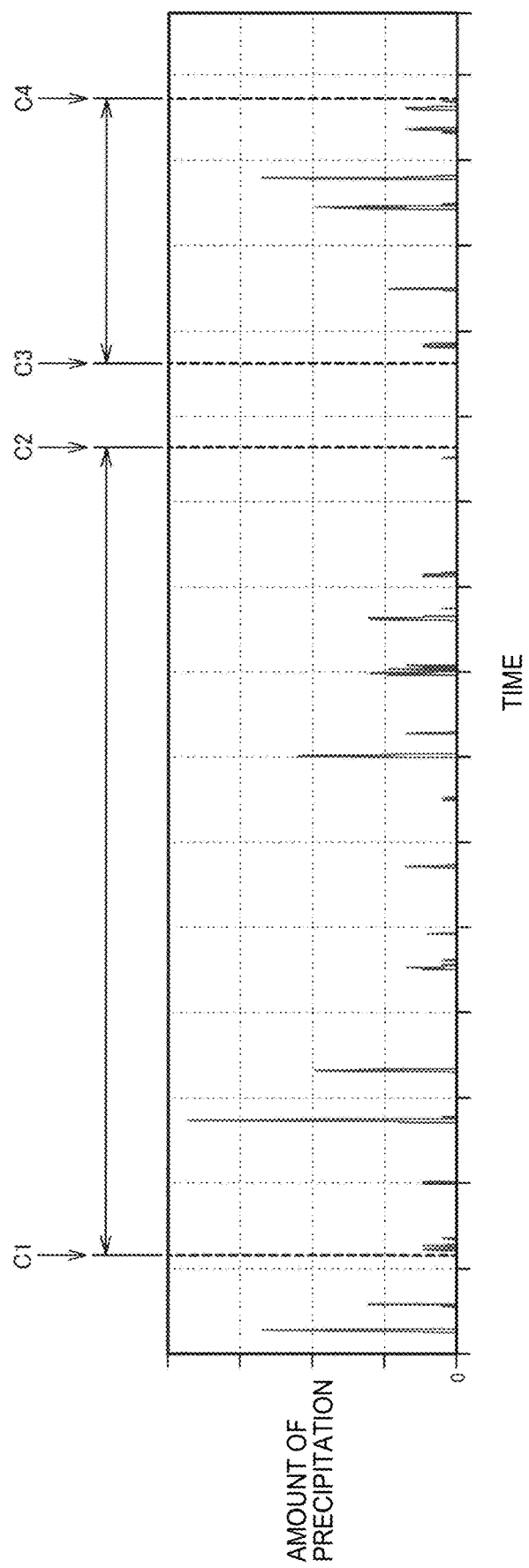
FIG. 10 is a detailed temporal change example of an amount of precipitation around the given bridge.
Figure 11:
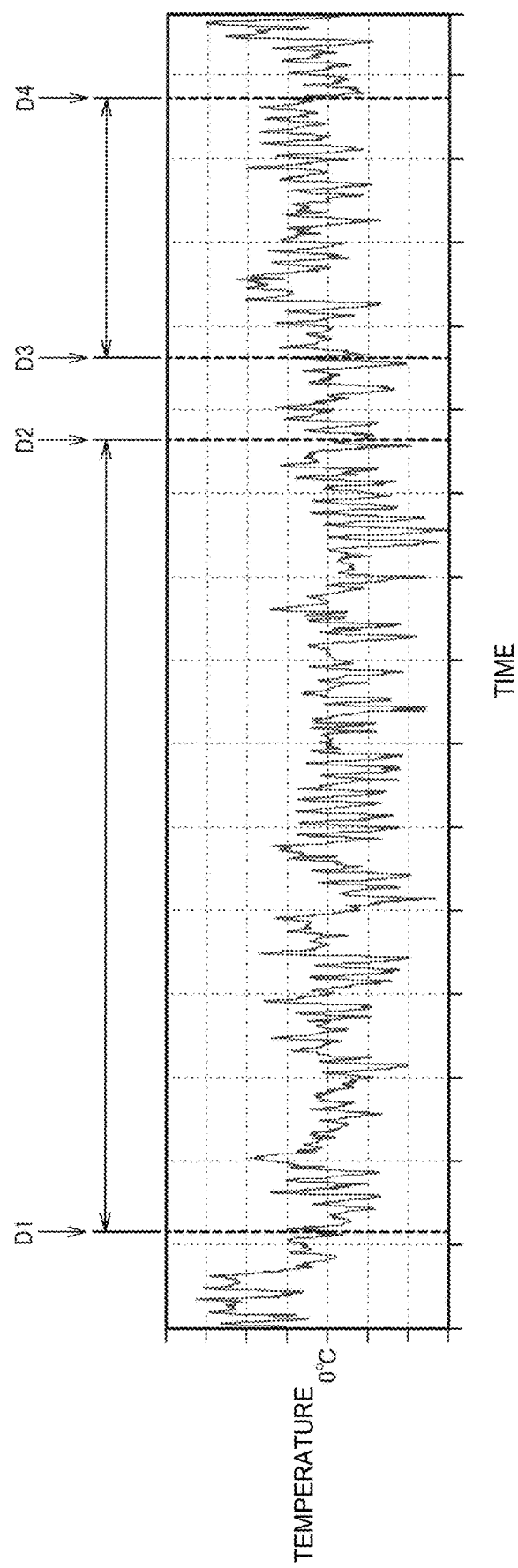
FIG. 11 is a detailed temporal change example of ambient temperature information (temperature) of the given bridge.

This is examined more in detail with reference to FIGS. 9 to 11. FIG. 9 is extracted detailed data in a period from the last ten days of November to the middle ten days of March in the time-series change in the peak vibration frequency shown in FIG. 8. One scale of the horizontal axes of FIGS. 9 to 11 corresponds to seven days. FIG. 10 is a diagram representing a time-series change in an amount of precipitation in a period same as the period shown in FIG. 9. FIG. 11 is a diagram representing a time-series change in the temperature in a period same as the period shown in FIG. 9 and is a diagram of an extracted part of FIG. 7. B1 in FIG. 9, C1 in FIG. 10, and D1 in FIG. 11 represent the same timing. Similarly, B2, C2, and D2 represent the same timing, B3, C3, and D3 represent the same timing, and B4, C4, and D4 represent the same timing.

As shown in FIG. 11, a rate of the temperature below the zero degree is extremely high in a period of D1 to D2. Therefore, precipitation in C1 to C2 in FIG. 10, which is the same period, is highly likely to be snowfall. As it is seen from data in B1 to B2, a degree of change in the peak vibration frequency in the same period is large. That is, FIGS. 9 to 11 can be considered data that supports an assumption that a characteristic of an increasing degree of change in the peak vibration frequency is due to the snow-covered state or the frozen state.

Note that the peak vibration frequency also greatly changes in a period of B2 to B3. The degree of change decreases in a period of B3 to B4. This is considered to be because, although there was no new snowfall, snow fallen before remained without melting (remained as a continuous snow cover) and the continuous snow cover melted in a period to B3. This is inferred from the fact that the amount of precipitation is 0 in C2 to C3 in FIG. 10 and a frequency of the temperature becoming equal to or higher than 0 degree is high in D2 to D3 compared with the period of D1 to D2 in FIG. 11.

The degree of change in the peak vibration frequency increases again in B4 and the subsequent period. However, the temperature suddenly drops in D4 and the subsequent period in FIG. 11. Therefore, it can be inferred that a characteristic change of the peak vibration frequency is due to freezing of the structure surface, for example, freezing of moisture caused by precipitation (rainfall) immediately before C4.

As explained above, it is also inferred from detailed weather data that it is possible to determine the surface state of the structure on the basis of the degree of change in the peak vibration frequency. In the following explanation, it is explained that determination of the surface state is possible, in other words, the frozen state or the snow-covered state and the other states can be separated actually on the basis of the degree of change in the peak vibration frequency.

Figure 12:
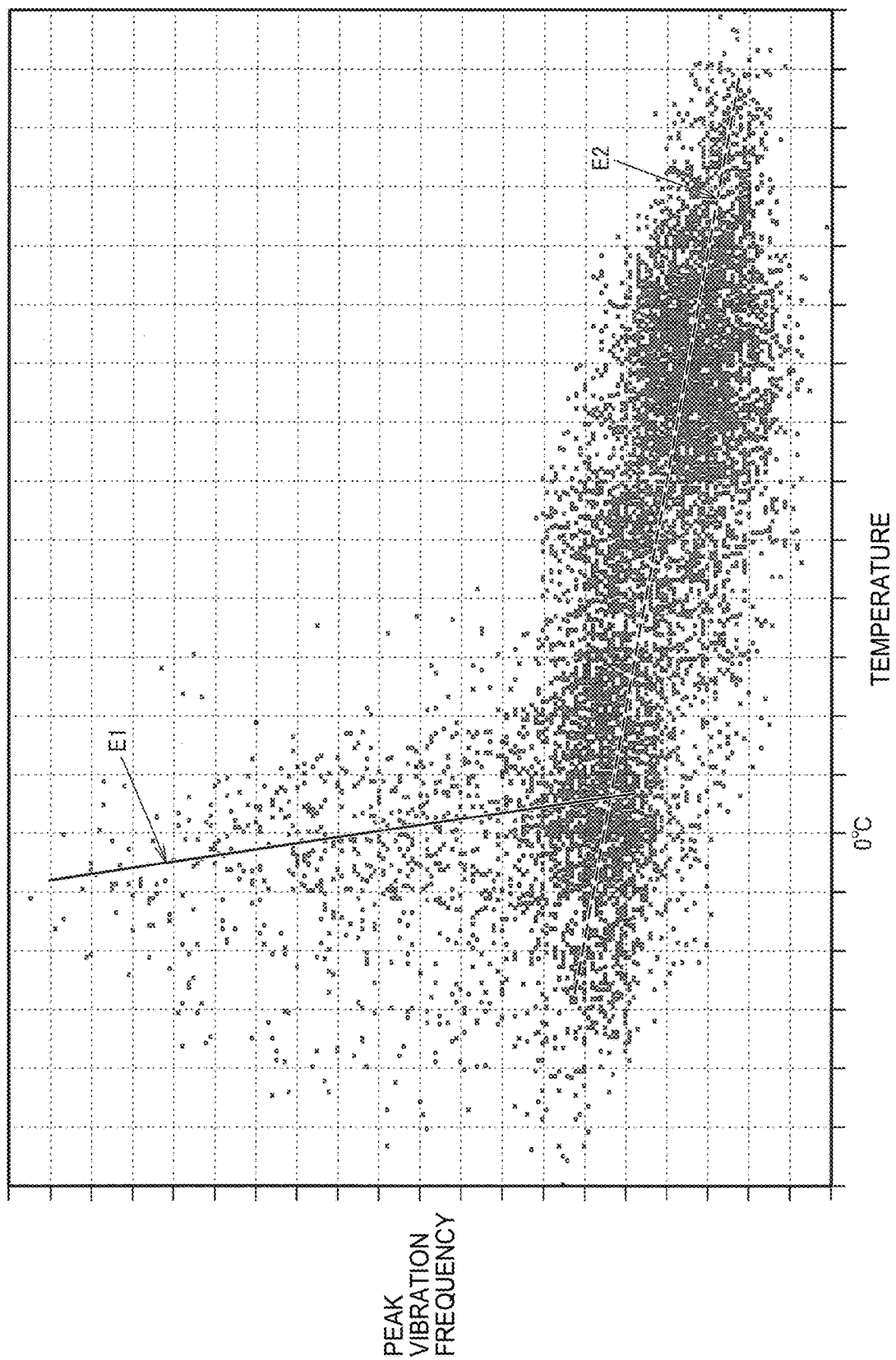
FIG. 12 is a correlation diagram of the peak vibration frequency and the ambient temperature information of the given bridge.

FIG. 12 is a diagram showing a set of values of an average of a peak vibration frequency in one hour and an average temperature. The average temperature plotted on the horizontal axis. The average peak vibration frequency is plotted on the vertical axis. Note that, in FIG. 12, data for one year is plotted.

As it is seen from FIG. 12, two correlations, that is, a primary correlation indicated by E1 and a primary correlation indicated by E2 are observed between the temperature and the peak vibration frequency. Considering an examination result obtained with reference to FIGS. 7 to 11, it is inferred that E1 indicates a correlation at the time when the surface state of the structure is a first surface state and E2 indicates a correlation at the time when the surface state is a second surface state. That is, if a range of E1 and a range of E2 can be separated, it is possible to determine the surface state of the structure on the basis of the peak vibration frequency.

Figure 13:
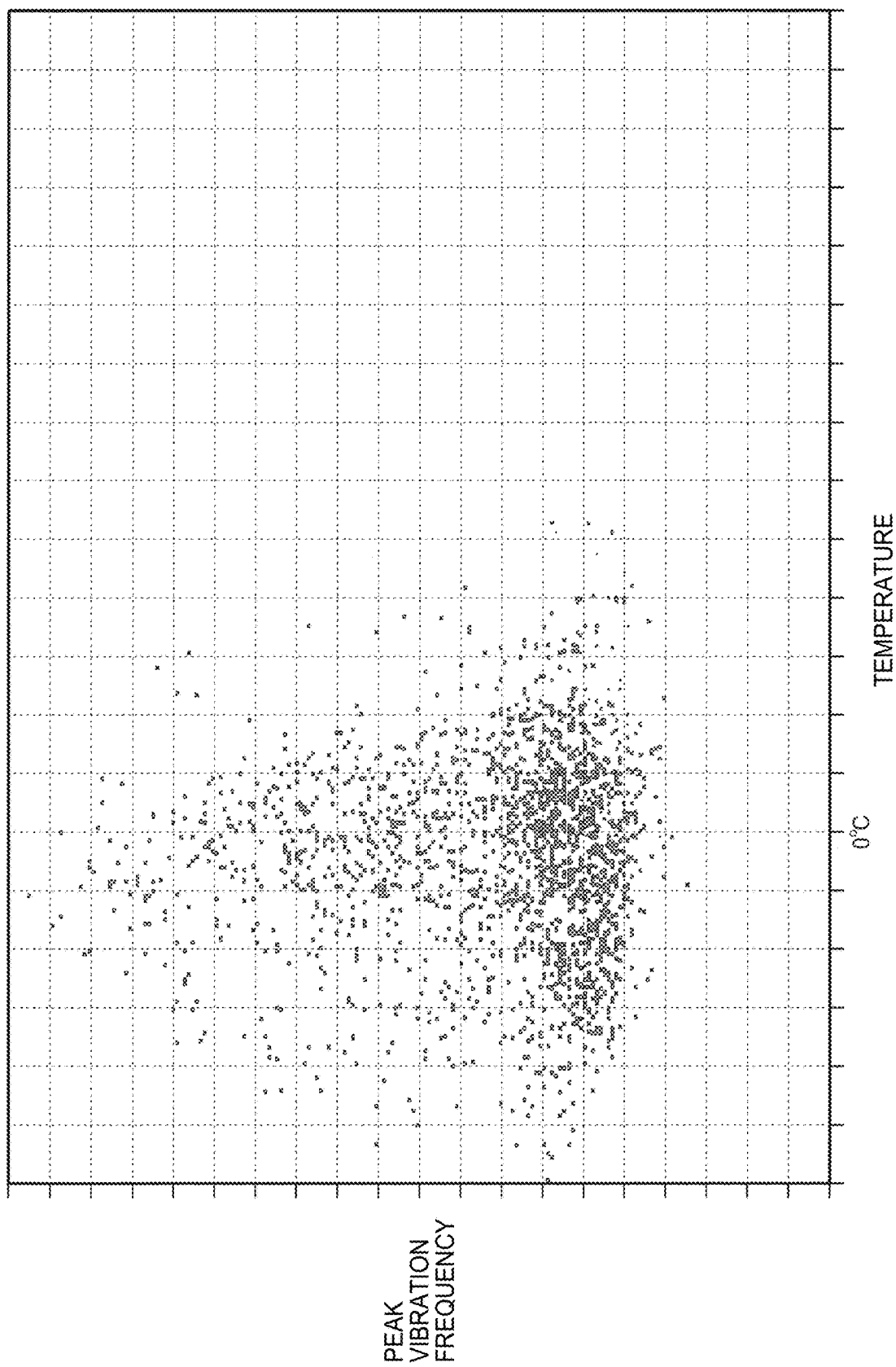
FIG. 13 is a correlation diagram of the peak vibration frequency and the ambient temperature information separated on the basis of a period.
Figure 14:
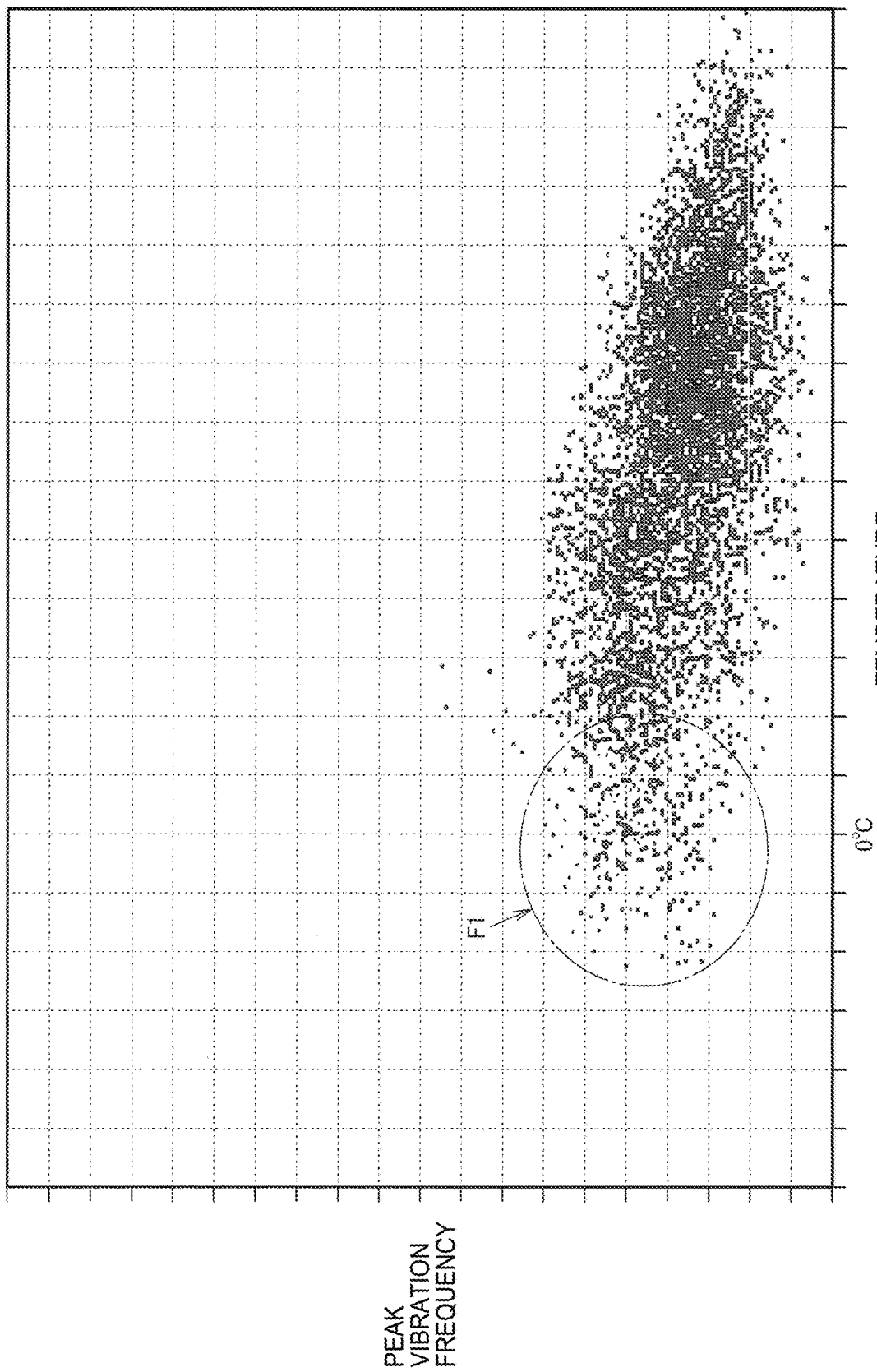
FIG. 14 is a correlation diagram of the peak vibration frequency and the ambient temperature information separated on the basis of the period.

FIGS. 13 and 14 are diagrams in which the data shown in FIG. 12 are classified on the basis of a period in which the data are acquired. FIG. 13 is a diagram of extracted data in a period from December 1 to March 15 of the next year among the data plotted in FIG. 12. FIG. 14 is a diagram of extracted data in a period other than the period of December 1 to March 15 of the next year among the data plotted in FIG. 12.

As it is seen from FIGS. 12 to 14, the data shown in FIG. 13 corresponds to the data included in the range of E1 shown in FIG. 12. The data shown in FIG. 14 corresponds to the data included in the range of E2 shown in FIG. 12. As explained above with reference to FIGS. 7 to 11, the surface of the structure is often in the snow-covered state or the frozen state in the period of December 1 to March 15 of the next year. That is, it may be considered that E1 shown in FIG. 12 corresponds to a correlation in the case of the frozen state or the snow-covered state and E2 corresponds to a correlation in the case of a normal state (a state that is neither the snow-covered state nor the frozen state).

However, FIGS. 13 and 14 are data for confirming that the E1 and E2 respectively indicate correlations corresponding to different surface states. However, it is not considered desirable to perform separation processing of E1 and E2 according to a period (a season). This is because the separation method shown in FIGS. 13 and 14 only indicates a very ordinary fact that likelihood of freezing and snow cover increases in a cold period of winter. No particular effect is obtained even if such a result is notified to the user. As shown in a period of B3 to B4 and the like in FIGS. 9 to 11, in some case, the surface state is the normal state even in winter. Therefore, it is necessary to separate such a case from the frozen state or the snow-covered state.

As explained above with reference to FIGS. 7 to 11, it is inferred that there is a correlation between a large change width in one day of the peak vibration frequency and the frozen state and the snow-covered state of the structure surface. That is, if the data shown in FIG. 12 can be separated into E1 and E2 using the change width of the peak vibration frequency, it is considered possible to determine the surface state on the basis of the change width of the peak vibration frequency.

Figure 15:
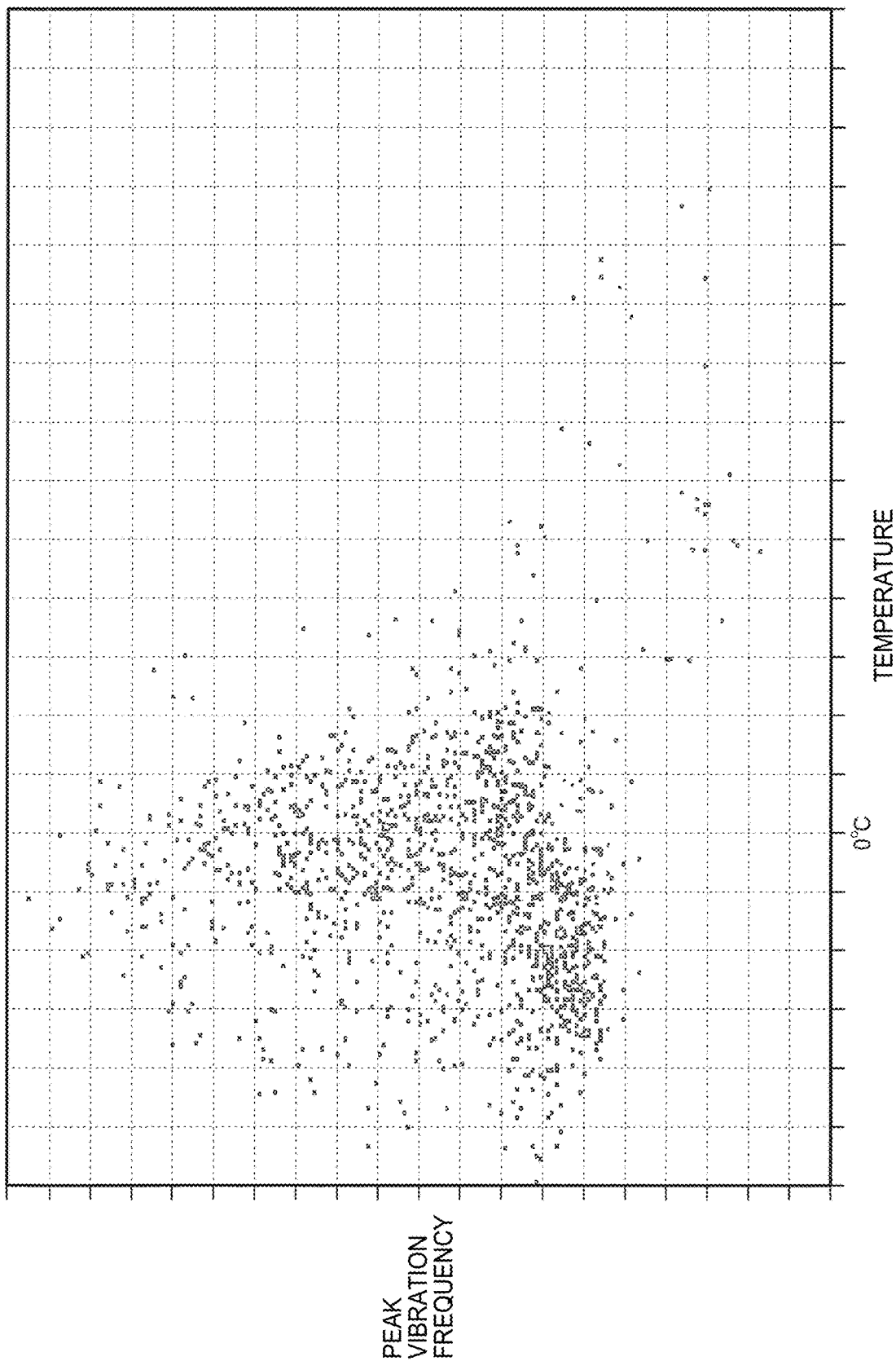
FIG. 15 is a correlation diagram of the peak vibration frequency and the ambient temperature information separated on the basis of a change width of the peak vibration frequency.
Figure 16:
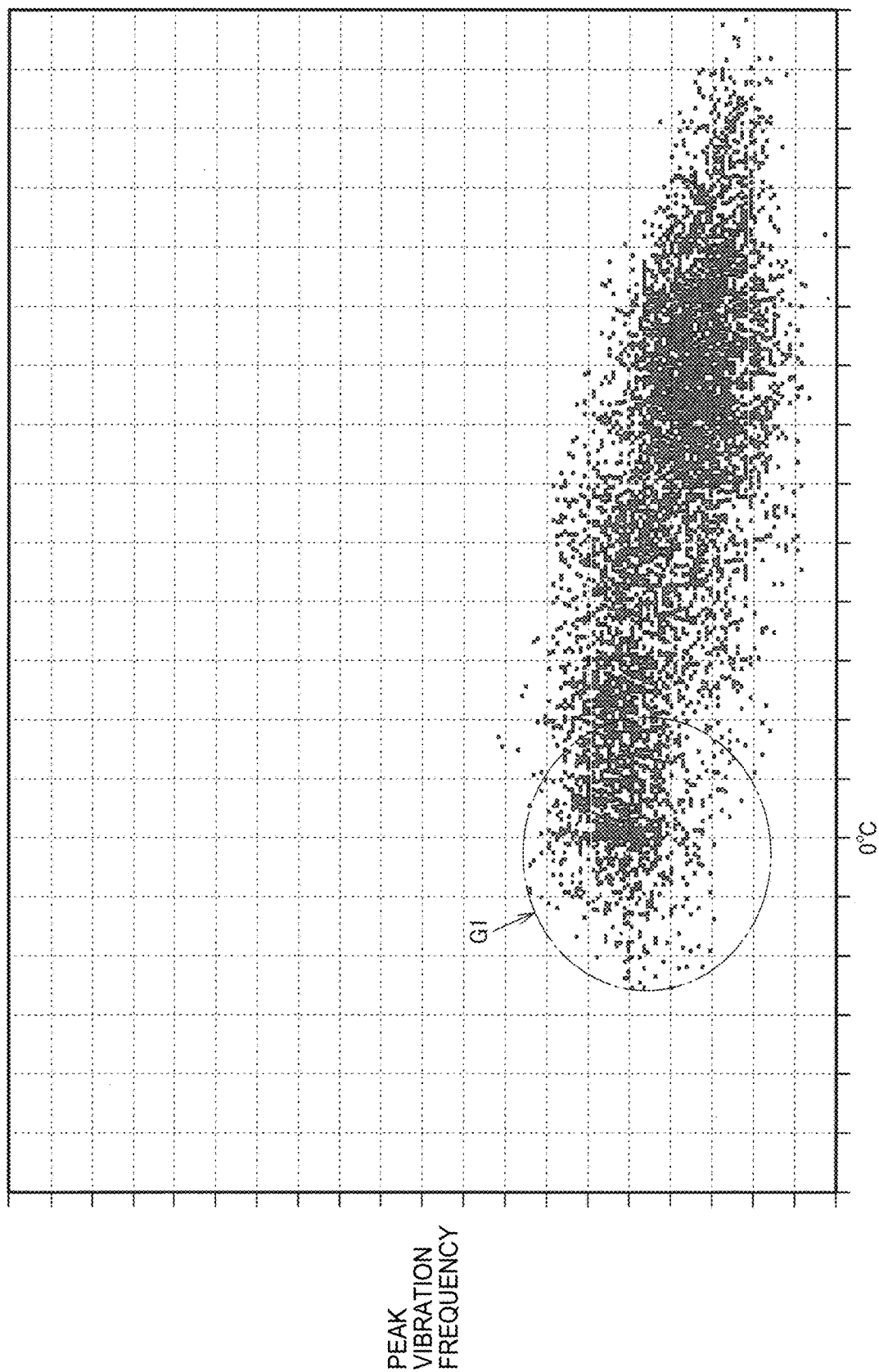
FIG. 16 is a correlation diagram of the peak vibration frequency and the ambient temperature information separated on the basis of the change width of the peak vibration frequency.

FIGS. 15 and 16 are diagrams in which the data shown in FIG. 12 are classified on the basis of the change width of the peak vibration frequency. FIG. 15 is a diagram of extracted data of a day when the change width in one day of the peak vibration frequency is larger than a given threshold Th among the data plotted in FIG. 12. FIG. 16 is a diagram of extracted data of a day when the change width is equal to or smaller than the given threshold Th.

As shown in FIGS. 15 and 16, it is seen that the data shown in FIG. 12 can be separated into E1 and E2 on the basis of the change width of the peak vibration frequency. In particular, as it is seen when a range indicated by F1 in FIG. 14 and a range indicated by G1 in FIG. 16 are compared, a part of the data determined as E1 (the frozen state or the snow-covered state) in the separation according to a period is determined as E2 (the normal state) in the separation according to the change width of the peak vibration frequency. That is, it is seen that, by using the change width of the peak vibration frequency, it is possible to appropriately detect the surface state that is neither the frozen state nor the snow-covered state even in winter.

As explained above, the processing section 120 determines the surface state of the structure on the basis of the change information of the peak vibration frequency. As shown in FIGS. 7 and 8, it is evident from the measured data that there is the correlation between the surface state and the change information of the peak vibration frequency. It is possible to actually determine the surface state as explained with reference to FIGS. 12, 15, and 16. Note that the change information is information representing a time-series change in the peak vibration frequency.

More specifically, the processing section 120 determines the surface state of the structure on the basis of a change width in a predetermined period of the peak vibration frequency.

In the example shown in FIGS. 15 and 16, one day is considered as the predetermined period. Therefore, the change width in the predetermined period of the peak vibration frequency is information representing changes in values of a plurality of peak vibration frequencies acquired in one day. In an example in which one peak vibration frequency is calculated per one hour, a change width of twenty-four data only has to be calculated. As an example, the processing section 120 calculates, as the change width, a difference value between a maximum and a minimum of the twenty-four data or information equivalent to the difference value. The information equivalent to the difference value may be a square of the difference value or may be a value obtained by normalizing (dividing) the difference value with an average of the peak vibration frequencies. The information equivalent to the difference value includes various kinds of information based on the difference value.

The processing section 120 determines that the surface state is the first surface state when the change width in the predetermined period is larger than the given threshold Th and determines that the surface state is the second surface state different from the first surface state when the change width in the predetermined period is equal to or smaller than the given threshold Th.

Consequently, it is possible to determine the surface state on the basis of a magnitude relation between the change width and the threshold Th. That is, if the given threshold Th can be set, the determination processing of the surface state after the setting of the given threshold Th can be executed only if the change width of the peak vibration frequency can be acquired. It is possible to realize the surface state determination according to processing with a light load. In other words, if the threshold Th is calculated once, thereafter, it is not essential to create the plot data shown in FIG. 12. Thereafter, if only the determination processing of the surface state is considered, it is unnecessary to acquire temperature information. It is sufficient if only the peak vibration frequency can be calculated.

Note that, as shown in FIGS. 12 to 16, the first surface state in which the change width of the peak vibration frequency is larger than the threshold Th is at least one state of the frozen state and the snow-covered state. The second surface state is a state that is neither the frozen state nor the snow-covered state. However, in a broad sense, the first surface state is the abnormal state and the second surface state is the normal state.

In FIGS. 12, 15, and 16, the example is shown in which the change width in the predetermined period is used as the change information of the peak vibration frequency. However, as shown in FIGS. 7 to 11, it is possible to determine the surface state according to whether a degree of change in the peak vibration frequency is large. Therefore, the change information in this embodiment may be other kinds of information representing the degree of change in the peak vibration frequency. For example, information such as dispersion of the peak vibration frequency in the predetermined period may be used.

3.3 Data Example in a Different Bridge

It is explained above that the surface state can be determined according to the change information of the peak vibration frequency when one bridge is set as the target of the determination. FIGS. 17 to 21 are measured data in a bridge different from the bridge set as the target in FIGS. 7 to 16 and measured data in a peripheral environment of the different bridge.

Figure 17:
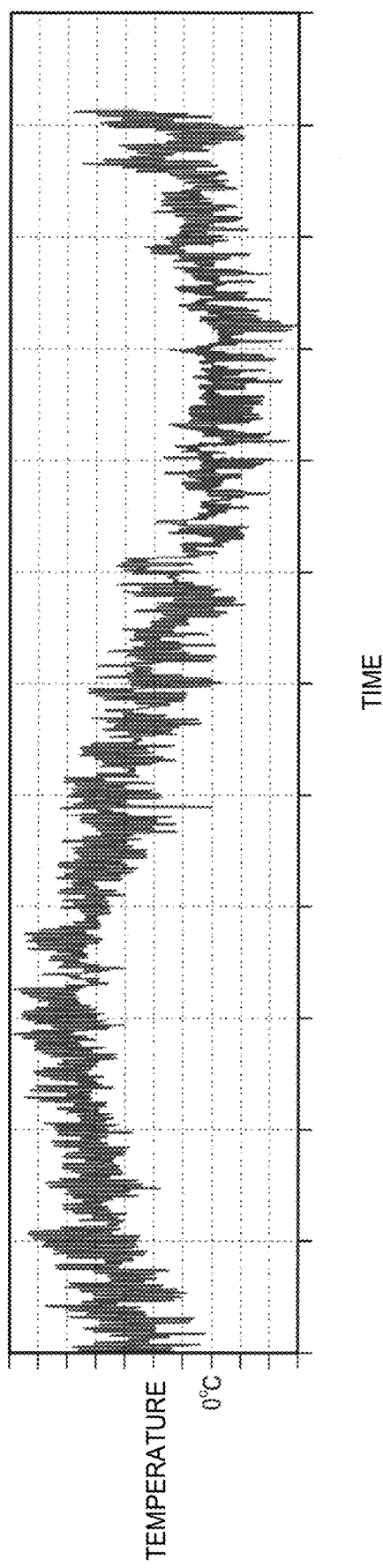
FIG. 17 is a temporal change example of ambient temperature information (temperature) of another bridge.
Figure 18:
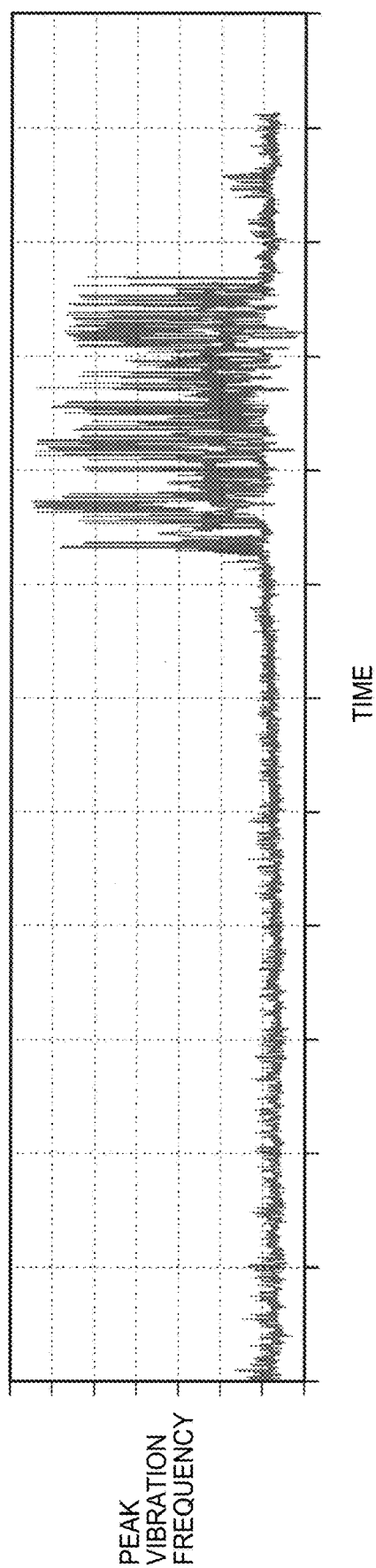
FIG. 18 is a temporal change example of a peak vibration frequency of the other bridge.

FIG. 17 is a diagram representing a time-series change in temperature. FIG. 18 is a diagram representing a time-series change in a peak vibration frequency. One scale of the horizontal axes of FIGS. 17 and 18 corresponds to thirty days as in FIGS. 7 and 8. It is seen from FIGS. 17 and 18 that, as in the example shown in FIGS. 7 and 8, a change in the peak vibration frequency increases in winter when the temperature drops. That is, in the case of the bridge, as in the above explanation, it is inferred that the surface state can be determined according to the change information of the peak vibration frequency.

Figure 19:
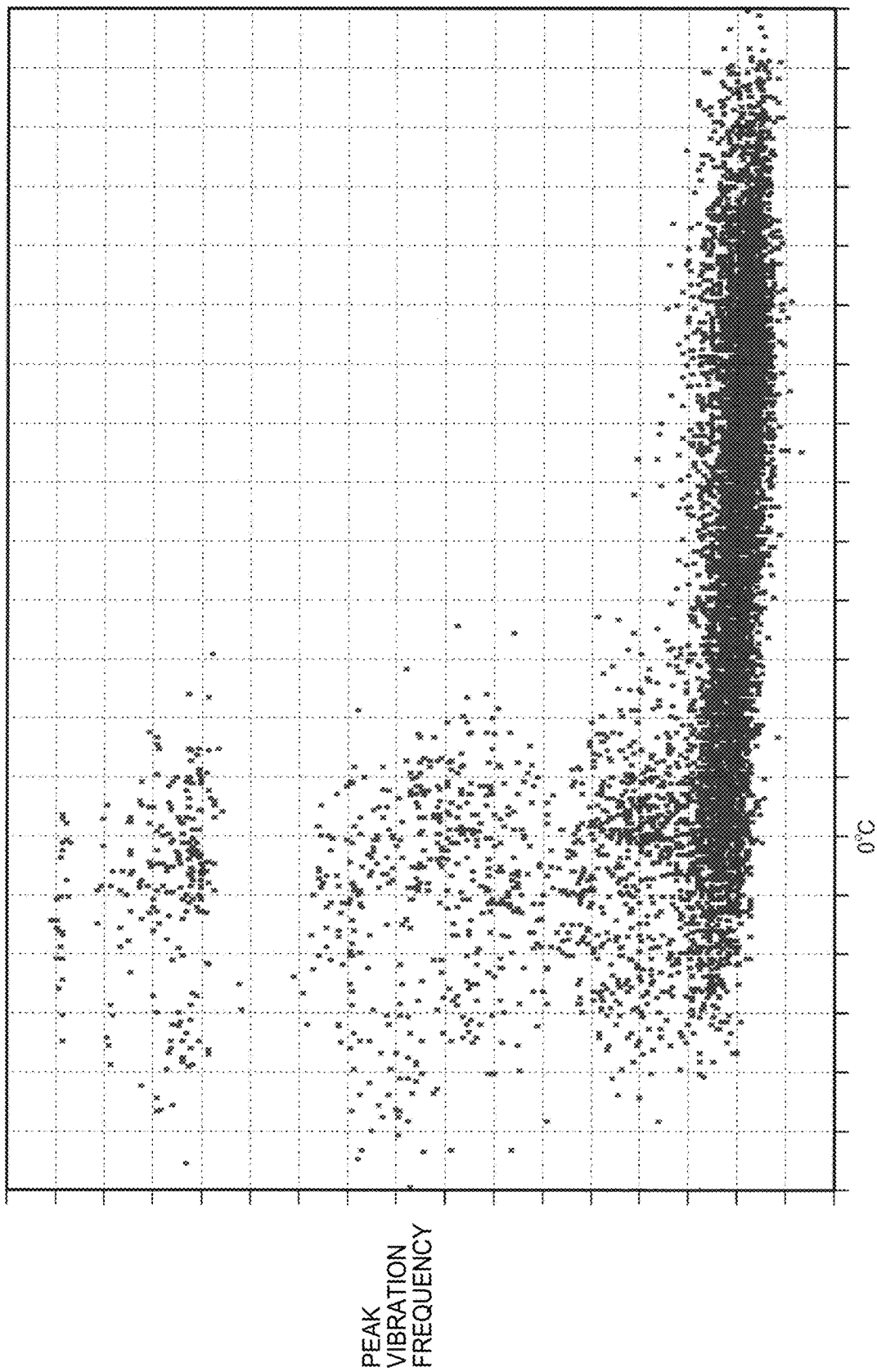
FIG. 19 is a correlation diagram of the peak vibration frequency and the ambient temperature information of the other bridge.
Figure 20:
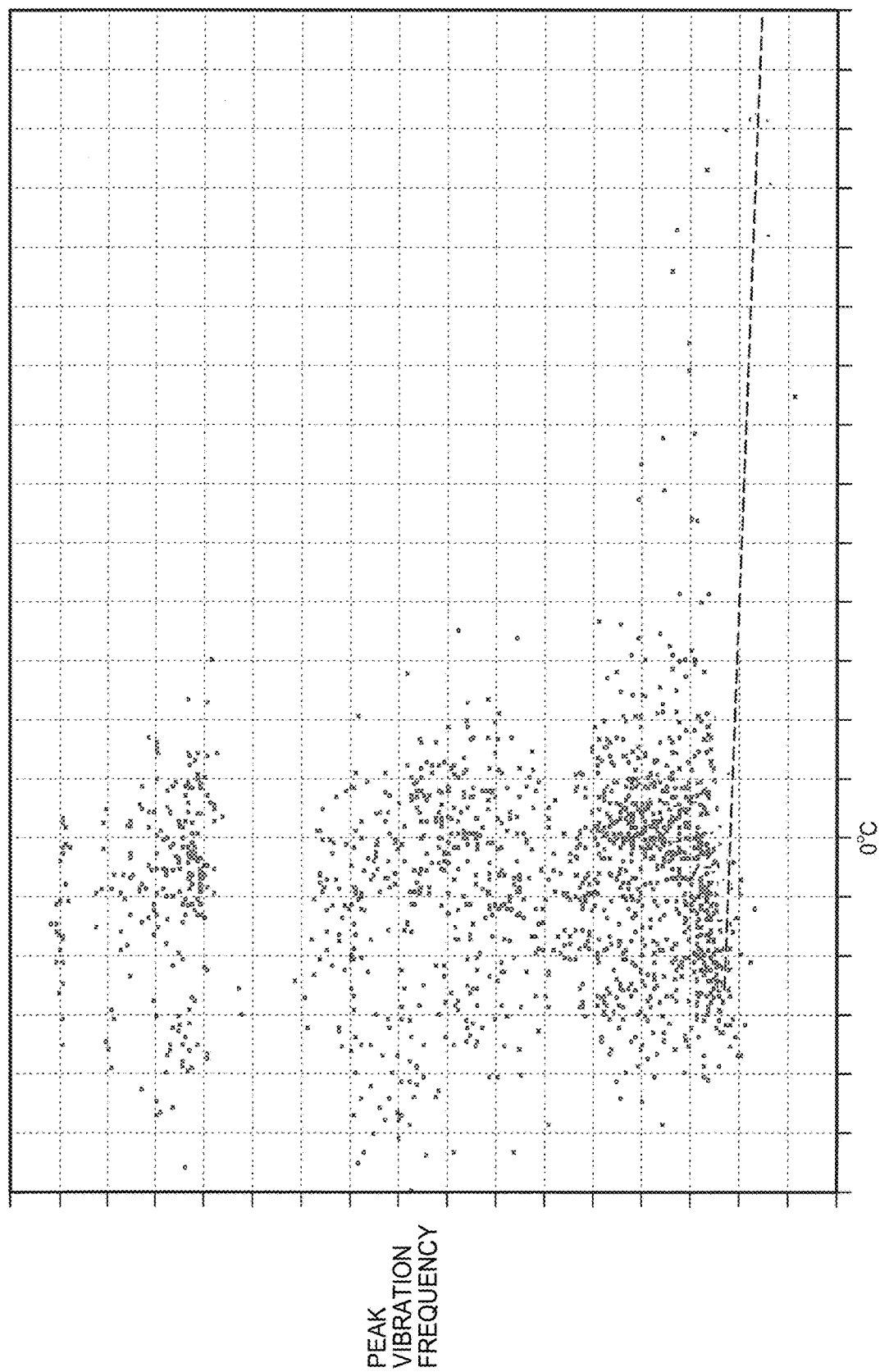
FIG. 20 is a correlation diagram of the peak vibration frequency and the ambient temperature information separated on the basis of the change width of the peak vibration frequency.
Figure 21:
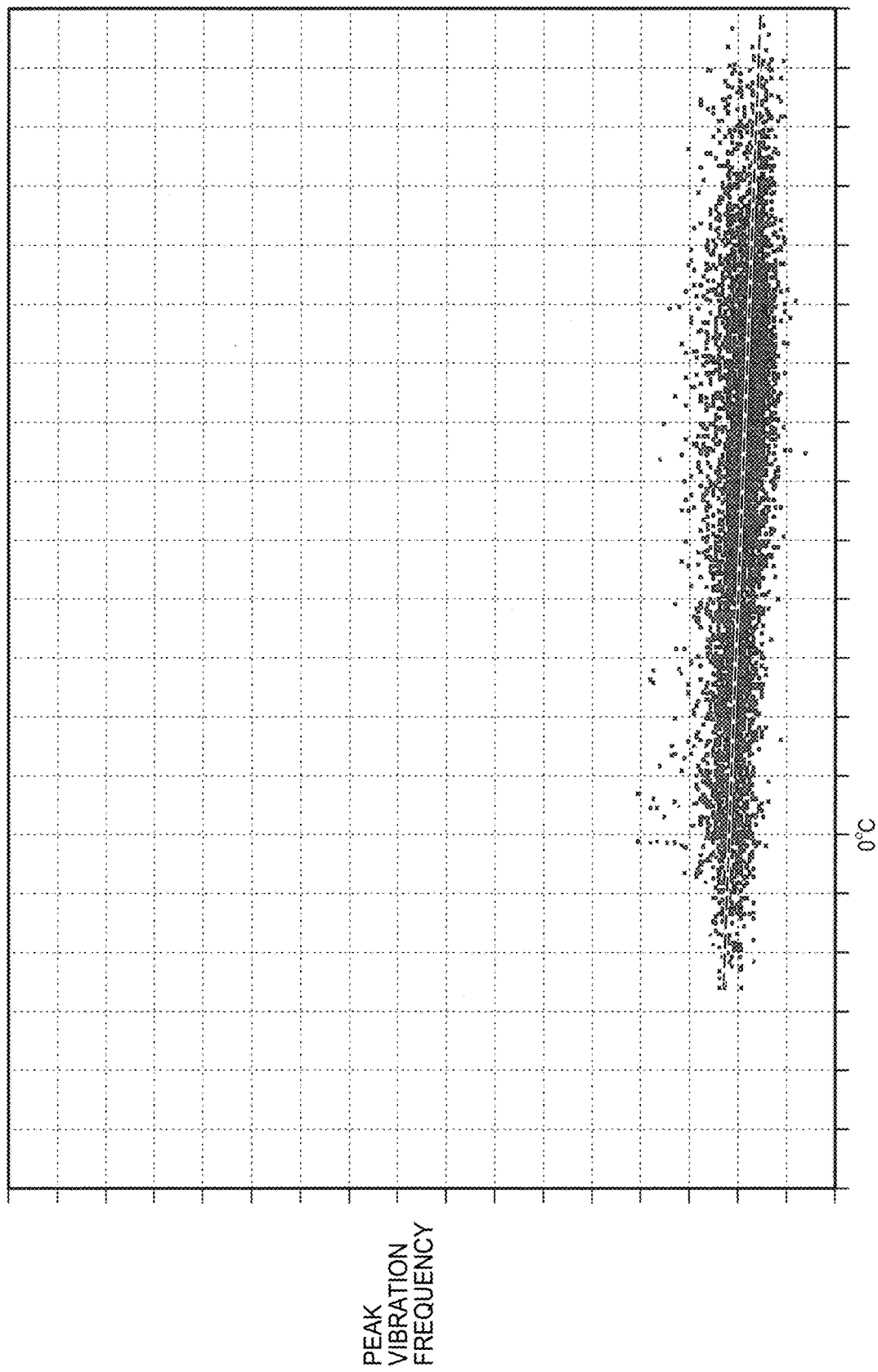
FIG. 21 is a correlation diagram of the peak vibration frequency and the ambient temperature information separated on the basis of the change width of the peak vibration frequency.

FIG. 19 is a diagram in which an average of the peak vibration frequency and an average of the temperature in a predetermined time (one hour) are plotted. FIG. 19 corresponds to FIG. 12 referred to above. FIGS. 20 and 21 are diagrams in which data shown in FIG. 19 are classified on the basis of a change width of the peak vibration frequency. FIG. 20 is a diagram of extracted data of a day when the change width in one day of the peak vibration frequency is larger than a given threshold Th' among the data plotted in FIG. 19. FIG. 20 corresponds to FIG. 15. FIG. 21 is a diagram of extracted data of a day when the change width is equal to or smaller than the given threshold Th'. FIG. 21 corresponds to FIG. 16. Note that, if a structure is different, the peak vibration frequency of the structure is also different and a specific value of the change width is also different. Therefore, in general, the given threshold Th' is a value different from the threshold Th in the bridge explained above with reference to FIGS. 7 to 16.

As it is seen from FIGS. 19 to 21, when the different bridge is set as the target, as in the above explanation, two primary correlations are observed in the plot data of the average of the peak vibration frequency and the average of the temperature. It is possible to separate the two correlations on the basis of determination processing of the change width in the predetermined period of the peak vibration frequency and the threshold Th'. That is, it is possible to determine the surface state of the structure on the basis of the change information of the peak vibration frequency.

4. Modifications

Several modifications are explained below.

4-1. Threshold Setting for the Change Width of the Peak Vibration Frequency

As explained above with reference to FIGS. 12, 15, 16, and 19 to 21, it is possible to determine the surface state of the structure on the basis of the magnitude determination of the change width of the peak vibration frequency and the given threshold Th (or Th'). However, as the threshold Th, any value may not be used. The threshold Th has to be a value with which the change width of the peak vibration frequency corresponding to the first state (the frozen state and the snow-covered state) and the change width of the peak vibration frequency corresponding to the second state (the normal state) can be appropriately separated.

Figure 22:
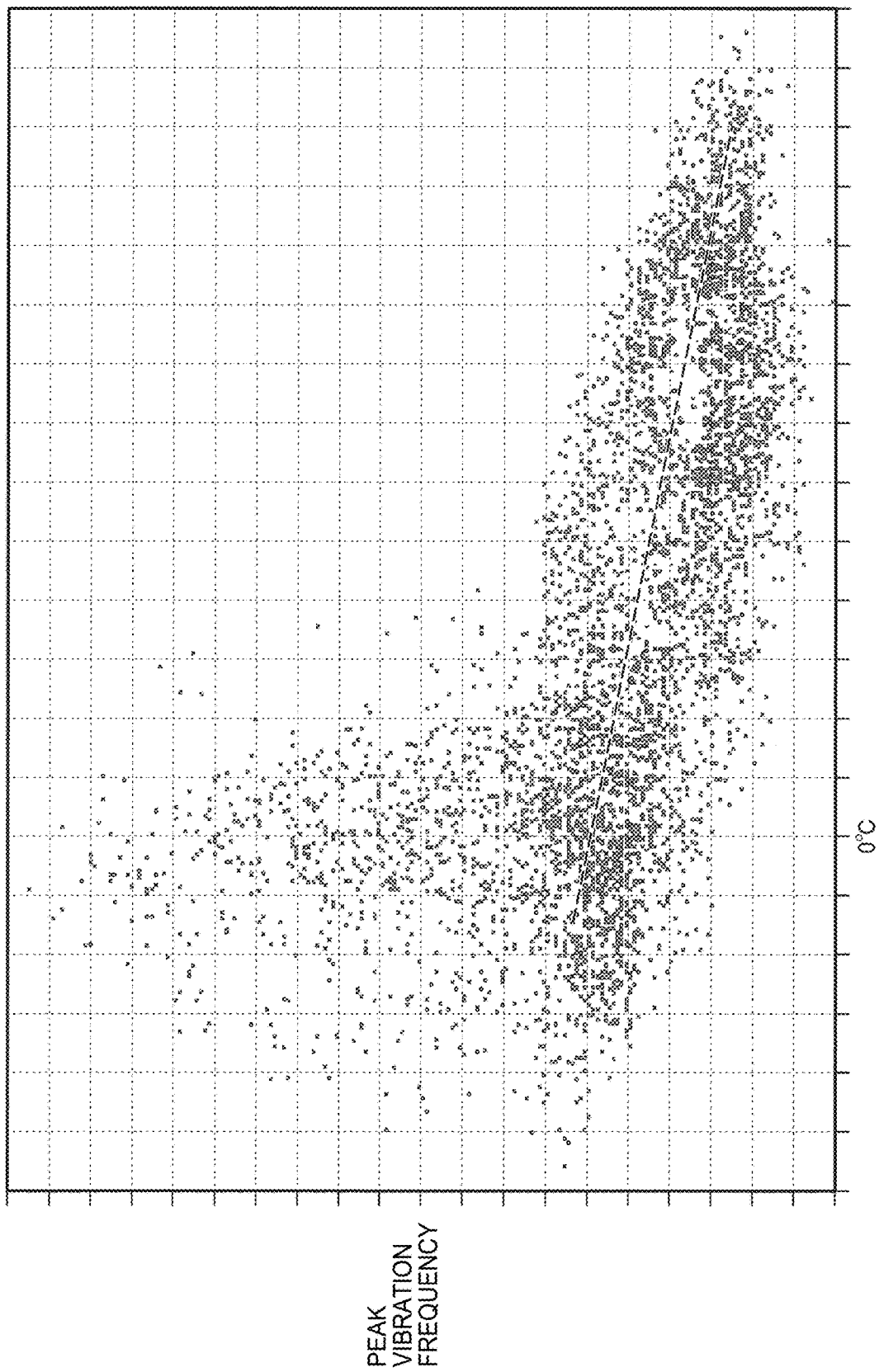
FIG. 22 is a separation result example obtained when an excessively small threshold is used.
Figure 23:
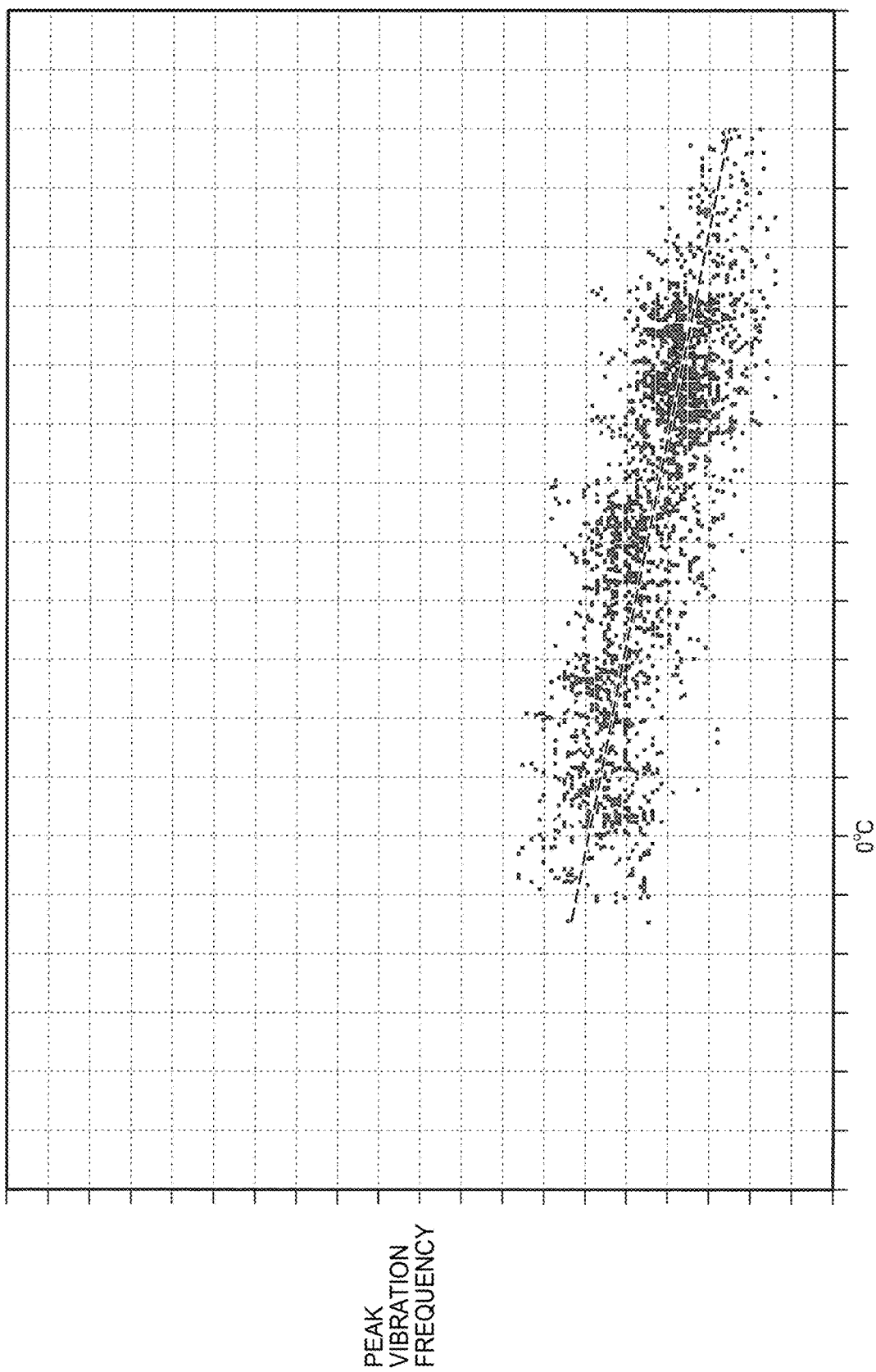
FIG. 23 is a separation result example obtained when the excessively small threshold is used.

FIG. 22 is a diagram of extracted data of a day when the change width in one day of the peak vibration frequency is larger than a first threshold Th1 among the data plotted in FIG. 12. FIG. 23 is a diagram of extracted data of a day when the change width is equal to or smaller than the first threshold Th1. Th1 is smaller than Th. As it is seen from FIGS. 12, 22, and 23, if a threshold to be set is too small, data that should originally be classified into E2 (the second surface state) is erroneously classified into E1 (the first surface state). That is, when the threshold is excessively small, the surface state cannot be appropriately determined.

Figure 24:
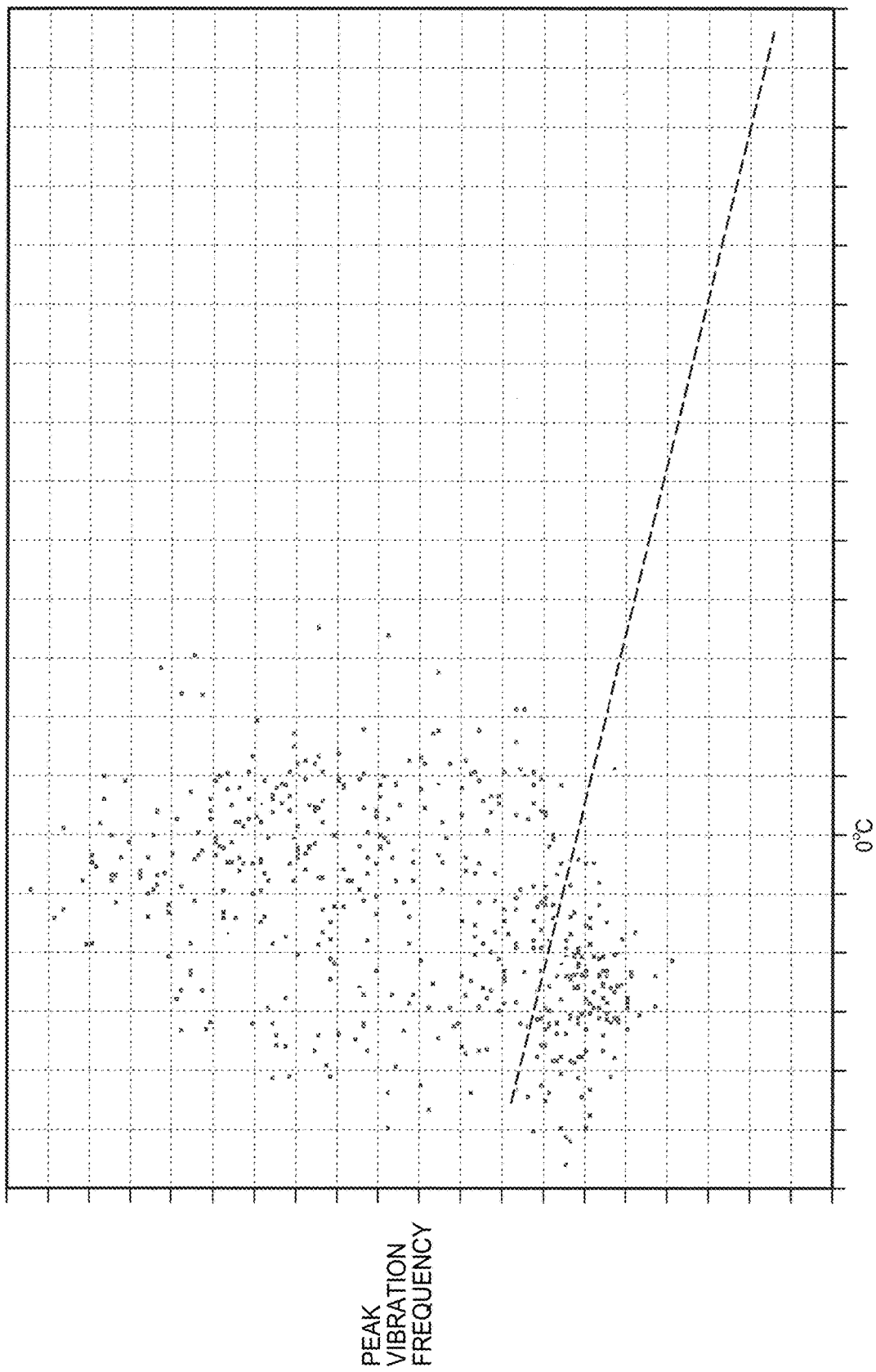
FIG. 24 is a separation result example obtained when an excessively large threshold is used.
Figure 25:
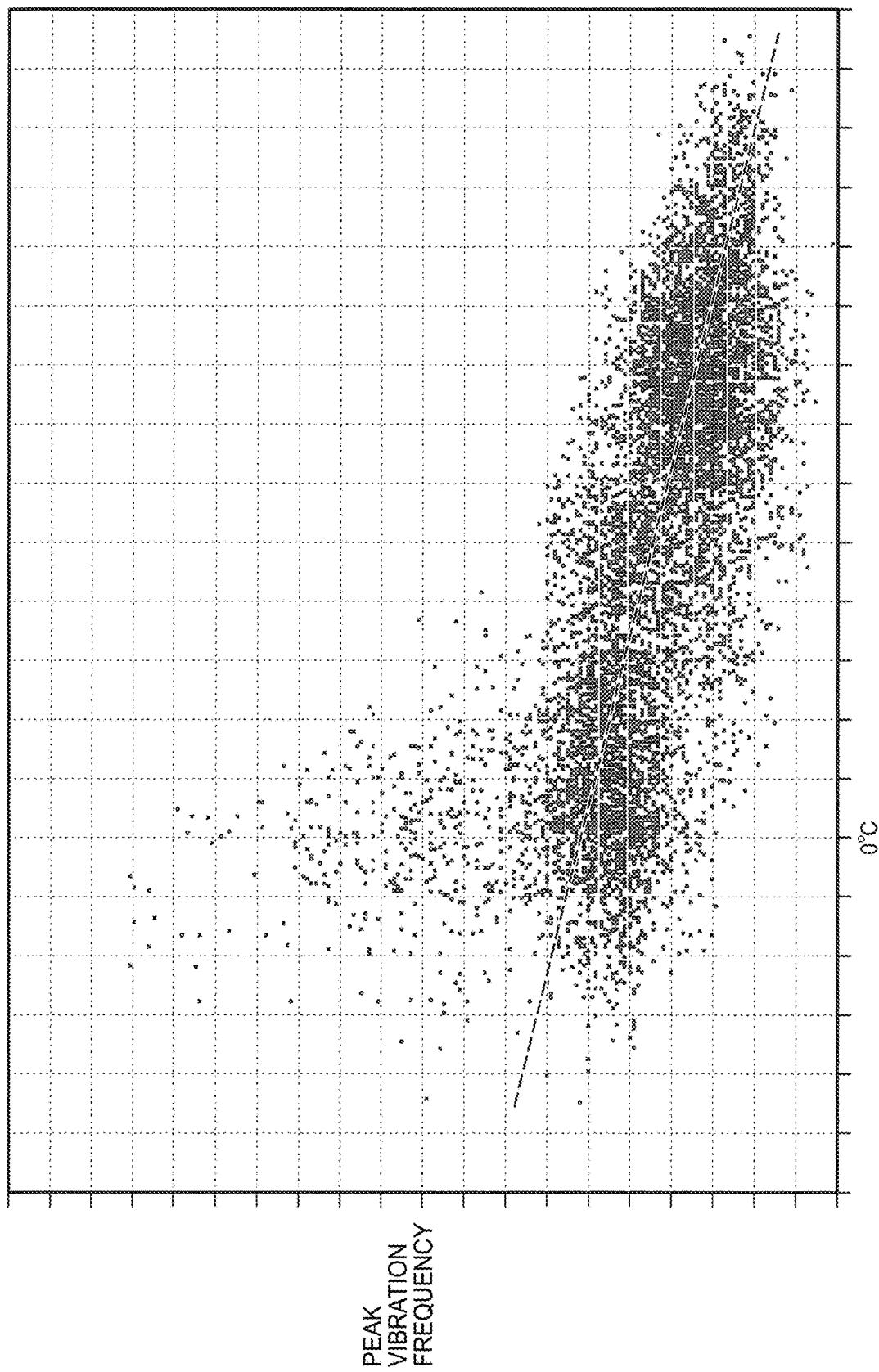
FIG. 25 is a separation result example obtained when the excessively large threshold is used.

On the other hand, FIG. 24 is a diagram of extracted data of a day when the change width in one day of the peak vibration frequency is larger than a second threshold Th2 among the data plotted in FIG. 12. FIG. 25 is a diagram of extracted data of a day when the change width is equal to or smaller than the second threshold Th2. Th2 is larger than Th. As it is seen from FIGS. 12, 24, and 25, if a threshold to be set is too large, data that should originally be classified into E1 (the first surface state) is erroneously classified into E2 (the second surface state). That is, the surface state cannot be appropriately determined when the threshold is excessively large.

That is, in this embodiment, it is necessary to appropriately set the threshold used for the comparison with the change width of the peak vibration frequency. Therefore, the processing section 120 desirably variably sets the given threshold. Then, it is possible to flexibly set the threshold used for the determination processing of the surface state. Therefore, it is possible to set the threshold for appropriately separating the first surface state and the second surface state and perform more accurate determination processing of the surface state by setting the threshold.

A specific method of setting the threshold is explained with reference to an example in which the frozen state and the snow-covered state are determined in a bridge. First, it is assumed that the observation system 100 is set in the bridge at timing (e.g., summer to autumn) when likelihood of snowfall and freezing is sufficiently low.

When the observation system 100 is set, respective initial values of a standard peak vibration frequency, a first threshold, and a second threshold are set in the observation system 100. For example, the storing section of the observation system 100 only has to store an initial standard peak vibration frequency, a first initial threshold, and a second initial threshold in advance. The initial standard peak vibration frequency is a predicted standard peak vibration frequency of the structure. The first threshold is a threshold corresponding to the change width from the peak vibration frequency for freezing determination. The second threshold is a threshold corresponding to the change width from the peak vibration frequency for snow cover determination.

After the observation system 100 is set, the processing section 120 performs an FFT analysis at every predetermined time (e.g., fifteen minutes) to measure a peak vibration frequency and updates the initial peak vibration frequency on the basis of the measurement data in one day. As explained above, likelihood of freezing and snowfall is sufficiently low in a certain degree of a period from the setting of the observation system 100. Therefore, as measurement data in one day, a change in the peak vibration frequency conforming to a temperature change in twenty-four hours without freezing and snow cover is observed. That is, the initial peak vibration frequency is written with an average, a median of a maximum and a minimum, and the like of the measurement data in one day to perform correction of the standard peak vibration frequency reflecting an actual construction state of the observation target bridge, fixing conditions and a setting place of a sensor, and the like.

The rewriting (the correction) of the standard peak vibration frequency may be performed every day as explained above but may be performed at an appropriate time by respectively changing and taking into account contribution degrees of data of one week, data of one month, and data of one year in an appropriate period. For example, after one month, the standard peak vibration frequency may be updated with a weighted average of an average of data for one month and an average of data of the preceding one day.

When a peak vibration frequency within a predetermined value region based on the standard peak vibration frequency is measured, the processing section 120 determines that the surface state is a standard state (without freezing and snow cover). When a difference between a measured peak vibration frequency and the standard vibration frequency exceeds the first threshold (the second threshold), the processing section 120 determines that a change to the frozen state (the snow-covered state) has occurred.

According to the rewriting of the standard peak vibration frequency, the processing section 120 may reflect a difference between the standard peak vibration frequency after update and the initial standard peak vibration frequency (in the following explanation, the difference is represented as Δ) on the first threshold and the second threshold. For example, the processing section 120 updates the first threshold to the initial value (the first initial threshold)+Δ and updates the second threshold to the initial value (the second initial threshold)+Δ.

Further, after the observation system 100 is set, the processing section 120 may perform the FFT analysis at every fifteen minutes to measure a peak vibration frequency and rewrite the first threshold according to a correlation analysis of measurement data in one day. In this case, the processing section 120 executes the measurement of the peak vibration frequency under a condition in which the frozen state could occur. Consequently, a change of the frozen state and the standard state is observed as a change in the peak vibration frequency together with a temperature change. That is, it is possible to perform correction for reflecting, on a first determination value (the first threshold), the influence on the frozen state due to the actual construction state of the bridge, the fixing conditions and the setting place of the sensor, and the like.

The rewriting (the correction) of the first threshold may be performed in every one day as explained above but may be performed at an appropriate time by respectively changing and taking into account contribution degrees of data of one week, data of one month, and data of one year in an appropriate period. For example, as in the correction of the standard peak vibration frequency, after one month, the first determination value may be updated with a weighted average of an average of data for one month and an average of data of the preceding one day.

The rewriting (the correction) of the second threshold (the snow-covered state) can be performed in the same manner as the rewriting (the correction) of the first threshold.

Note that the update of the first threshold and the second threshold is explained above. However, in a broader sense, the update can be considered to be expanded to a first determination value for freezing determination and a second determination value for snow cover determination. For example, the first determination value may be information representing a frequency band of the peak vibration frequency at which the surface state is determined as the frozen state. The second determination value may be information representing a frequency band of the peak vibration frequency at which the surface state is determined as the snow-covered state. The first determination value and the second determination value may be updated on the basis of the difference Δ between the standard peak vibration frequency after the update and the initial standard peak vibration frequency as explained above or may be updated according to a correlation analysis of measurement data.

The processing section 120 determines that the surface state is the standard state (without freezing and snow cover) when the peak vibration frequency within the predetermined value region based on the standard peak vibration frequency is measured. The processing section 120 determines the frozen state and the snow-covered state on the basis of the determination concerning whether a measured peak vibration frequency is within a range of the first determination value or within a range of the second determination value.

4.2 Other Surface State Determination Processing Using the Peak Vibration Frequency A method of determining the surface state from the change information (the change width) of the peak vibration frequency is explained above. However, a method of determining the surface state on the basis of the peak vibration frequency is not limited to this.

For example, as it is seen from FIGS. 12 and 19, in the first surface state, a value itself of the peak vibration frequency tends to be high compared with the value in the second surface state. Therefore, the surface state may be determined according to comparison processing of the value of the peak vibration frequency and a given threshold. The surface state is determined as the first surface state when the value of the peak vibration frequency is larger than the threshold. The surface state is determined as the second surface state when the value of the peak vibration frequency is equal to or smaller than the threshold. The peak vibration frequency in this case may be data at one timing or may be an average or the like of a plurality of data.

Alternatively, the information acquiring section 110 may acquire ambient temperature information (temperature) of the structure. The processing section 120 may determine the surface state of the structure on the basis of the ambient temperature information and the information concerning the peak vibration frequency. The ambient temperature information may be acquired from the weather sensor (a thermometer) included in the sensor terminal device 200 or may be received via the network as explained above.

As it is seen from FIGS. 12 and 19, even in a range corresponding to the second surface state, the peak vibration frequency tends to be lower as the temperature is lower. That is, since the peak vibration frequency and the temperature have a correlation, it is possible to improve determination accuracy by performing the processing taking into account a relation with the temperature rather than the value itself of the peak vibration frequency. For example, the value itself of the peak vibration frequency and the threshold are not compared but the value of the peak vibration frequency is normalized by a value of the temperature (a ratio of the value of the peak vibration frequency to the value of the temperature is calculated). Comparison processing of the value after the normalization and the threshold is performed.

Alternatively, as explained above with reference to FIGS. 12 and 19, if the relation between the peak vibration frequency and the temperature (the ambient temperature information) can be separated into the two primary correlations, it is possible to determine the surface state. That is, if a set of the peak vibration frequency and the ambient temperature information in a processing target period can be acquired, by determining in which position the data is plotted in FIGS. 12 and 19, it is possible to determine the surface state of the structure in the target period. The peak vibration frequency and the ambient temperature information in this case may be data at one timing or may be an average or the like of a plurality of data.

As an example, the processing section 120 only has to calculate a distance between a point where processing target data is plotted and a straight line corresponding to E1 and a distance between the plotted point and a straight line corresponding to E2 and determine a primary correlation at a closer distance as a correlation to which the processing target data belongs.

Any one of the methods of determining the surface state on the basis of the information concerning the peak vibration frequency explained above in this embodiment and the modifications only has to be used. However, the invention is not limited to this. A plurality of methods may be used in combination.

4.3 Setting Example of Timing for Performing the Determination Processing of the Surface State In the above explanation, timing for performing the determination processing of the surface state is not limited. For example, the determination processing may be executed irrespective of a season. However, it is assumed that the frozen state and the snow-covered state occur in a state in which temperature is extremely low, for example, water freezes or snowfall rather than rainfall occurs. Therefore, for example, in summer when temperature is sufficiently higher than 0 degree, in the first place, it is unnecessary to carry out the determination of the surface state according to this embodiment.

Therefore, the information acquiring section 110 may acquire weather information. The processing section 120 may determine on the basis of the weather information whether the determination of the structure surface state is performed. The weather information is not limited to information such as fair weather, cloudy weather, and rain and includes information concerning various weather conditions such as temperature, an amount of precipitation, humidity, wind speed, and a wind direction. However, in an example in which at least one of the frozen state and the snow-covered state is determined as the surface state, it is desirable to use, as the weather information, information indicating that temperature is 0 degree or less or is as low as 0 degree or rainfall or snowfall occurs.

Consequently, it is possible to execute the determination processing of the surface state when it is highly likely that the surface state is the abnormal state. In other words, when the necessity of the determination processing is low, the determination processing is not performed. Therefore, it is possible to reduce a processing load and power consumption.

However, in a period when an occurrence probability of the abnormal state is considered to be low such as summer, the determination processing of the surface state is not prevented from being performed. Although a value of the peak vibration frequency changes because of temperature and the like, the value of the peak vibration frequency has characteristics depending on the structure including a degree of the change. Therefore, although abnormality such as freezing or snow cover has not occurred, if the characteristics of the peak vibration frequency greatly change, it is likely that some abnormality (in particular, abnormality different from freezing and snow cover) has occurred in the measurement target structure. That is, in a situation in which likelihood of freezing and snow cover is extremely low, by intentionally performing the determination processing of the surface state in a situation, it is possible to detect abnormality different from freezing and snow cover.

Note that it is inferred that it is not easy to specify specific abnormality from the information concerning the peak vibration frequency. Therefore, when abnormality is detected, it is desirable to perform notification for urging the user to check a state of the structure and it is desirable to drive the other sensors of the sensor terminal device 200 to perform measurement for specifying abnormality.

The embodiment applied with the invention and the modifications of the embodiment are explained above. However, the invention is not limited to the embodiment and the modifications per se. In an implementation stage, the constituent elements can be modified and embodied in a range not departing from the spirit of the invention. Various inventions can be formed by appropriately combining the plurality of constituent elements disclosed in the embodiment and the modifications. For example, several constituent elements may be deleted from all the constituent elements described in the embodiment and the modifications. Further, the constituent elements described in different embodiments and modifications may be combined as appropriate. Terms described together with broader-sense or synonymous different terms at least once in the specification or the drawings can be replaced with the different terms in any part of the specification or the drawings. In this way, various modifications and applications are possible within the range not departing from the spirit of the invention.

The entire disclosure of Japanese Patent Application No. 2016-074028 filed Apr. 1, 2016 is expressly incorporated by reference herein.

What is claimed is:

1. An observation system for use with a structure, the observation system comprising: at least one acceleration sensor connected to the structure, the at least one acceleration sensor being configured to detect vibrations of the structure; a weather sensor being configured to detect ambient temperature of the structure; and a processor or integrated circuit configured to: acquire the detected vibrations from the at least one acceleration sensor and ambient temperature information of the structure from the weather sensor, calculate a peak vibration frequency of the detected vibrations, normalize the calculated peak vibration frequency based on a value of an ambient temperature of the structure detected by the weather sensor, calculate a change width representing a time-series change of the normalized peak vibration frequency over a predetermined period, and identify a surface state of the structure based on the calculated change width and the acquired ambient temperature information of the structure, wherein: a plurality of primary correlations that are observed between the ambient temperature of the structure and the peak vibration frequency are separated.

2. The observation system according to claim 1, wherein the processor or integrated circuit is further programmed to:
   determine that the surface state is a first surface state when the change width in the predetermined period is larger than a given threshold, and
   determine that the surface state is a second surface state different from the first surface state when the determined change width in the predetermined period is equal to or smaller than the given threshold.

3. The observation system according to claim 2, wherein the processor or integrated circuit variably sets the given threshold.

4. The observation system according to claim 2, wherein the first surface state is at least one of a frozen state and a snow-covered state.

5. The observation system according to claim 1, wherein the structure is a bridge, and
   the processor or integrated circuit is programmed to monitor processing of traffic volume information of the bridge on the basis of acceleration sensor information acquired from the at least one acceleration sensor.

6. The observation system according to claim 5, wherein the at least one acceleration sensor is set, in a bridge girder connected to a first bridge pier and a second bridge pier of the bridge, in a center portion between the first bridge pier and the second bridge pier.

7. The observation system according to claim 1, wherein the processor or integrated circuit is further programmed to:
   execute notification processing of the surface state of the structure.

8. The observation system according to claim 1, wherein
the processor or integrated circuit acquires weather information, and
the processor or integrated circuit determines whether the determination of the surface state of the structure is performed on the basis of the weather information.

9. A system for use with a structure, the system comprising: at least one acceleration sensor connected to the structure, the at least one acceleration sensor being configured to detect vibrations of the structure; a weather sensor being configured to detect ambient temperature of the structure; and a power supply unit including a battery; a charger configured to perform charging of the battery with natural energy, a processor or integrated circuit configured to: acquire the detected vibrations from the at least one acceleration sensor and ambient temperature information of the structure from the weather sensor, calculate a peak vibration frequency of the detected vibrations, normalize the calculated peak vibration frequency based on a value of an ambient temperature of the structure detected by the weather sensor, calculate a change width representing a time-series change of the normalized peak vibration frequency over a predetermined period, identify a surface state of the structure based on the calculated change width and the acquired ambient temperature information of the structure, and execute monitoring processing of a state of the structure based on the identified surface state of the structure, wherein: a plurality of primary correlations that are observed between the ambient temperature of the structure and the peak vibration frequency are separated.

10. The system according to claim 9, wherein
the structure is a bridge, and
the processor or integrated circuit executes monitoring processing of traffic volume information of the bridge on the basis of acceleration sensor information acquired from the at least one acceleration sensor.

11. The system according to claim 10, wherein the at least one acceleration sensor is set, in a bridge girder connected to a first bridge pier and a second bridge pier of the bridge, in a center portion between the first bridge pier and the second bridge pier.

12. The system according to claim 9, wherein the processor or integrated circuit is further programmed to:
execute notification processing of the surface state of the structure.

13. The system according to claim 9, wherein
the processor or integrated circuit acquires weather information, and
the processor or integrated circuit determines on the basis of the weather information whether the determination of the surface state of the structure is performed.

14. The observation system according to claim 9, wherein the processor or integrated circuit is further programmed to:
determine that the surface state is a first surface state when the change width in the predetermined period is larger than a given threshold, and
determine that the surface state is a second surface state different from the first surface state when the determined change width in the predetermined period is equal to or smaller than the given threshold.

15. An observation method for use with a structure, the observation method comprising: acquiring ambient temperature information of the structure from a weather sensor and acceleration information from at least one acceleration sensor that is connected to the structure, the at least one acceleration sensor being configured to detect vibrations of the structure; calculating, by a processor or integrated circuit, a peak vibration frequency of the detected vibrations; normalizing, by the processor or integrated circuit, the calculated peak vibration frequency based on a value of an ambient temperature of the structure detected by the weather sensor; calculating, by the processor or integrated circuit, a change width representing a time-series change of the normalized peak vibration frequency over a predetermined period based on the acquired acceleration information; and determining, by the processor or integrated circuit, a surface state of the structure based on the calculated change width and the acquired ambient temperature information of the structure, wherein: a plurality of primary correlations that are observed between the ambient temperature of the structure and the peak vibration frequency are separated.

* * * * *